(12) United States Patent
Kobayashi

(10) Patent No.: US 8,015,332 B2
(45) Date of Patent: Sep. 6, 2011

(54) KVM SWITCH AND KVM SYSTEM

(75) Inventor: Mitsuru Kobayashi, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 219 days.

(21) Appl. No.: 12/285,424

(22) Filed: Oct. 3, 2008

(65) Prior Publication Data

US 2009/0094393 A1  Apr. 9, 2009

(30) Foreign Application Priority Data

Oct. 3, 2007 (JP) ................................. 2007-260352
Feb. 1, 2008 (JP) ................................. 2008-023376

(51) Int. Cl.
*G06F 13/12* (2006.01)
(52) U.S. Cl. ................. 710/62; 710/63; 710/64; 710/69
(58) Field of Classification Search ........................ None
See application file for complete search history.

(56) References Cited

U.S. PATENT DOCUMENTS

| 6,567,869 | B2 | 5/2003 | Shirley | |
|---|---|---|---|---|
| 7,519,749 | B1* | 4/2009 | Sivertsen | 710/73 |
| 2005/0246433 | A1* | 11/2005 | Carrigan et al. | 709/223 |
| 2006/0017853 | A1* | 1/2006 | Chang et al. | 348/584 |
| 2006/0236347 | A1* | 10/2006 | Holovacs | 725/80 |
| 2007/0022176 | A1 | 1/2007 | Kobayashi | |

FOREIGN PATENT DOCUMENTS

| JP | 2005-18135 | 1/2005 |
|---|---|---|
| JP | 2007-34376 | 2/2007 |

* cited by examiner

*Primary Examiner* — Ilwoo Park
(74) *Attorney, Agent, or Firm* — Staas & Halsey LLP

(57) ABSTRACT

A KVM switch includes: an inputting portion that is capable of inputting a plurality of video signals output from an information processing apparatus; and a transmitting portion that adds the pieces of identification information of the respective corresponding video signals to the plurality of video signals input by the inputting portion, and transmits the plurality of video signals to which the pieces of identification information are added, to a remote terminal via a network.

33 Claims, 17 Drawing Sheets

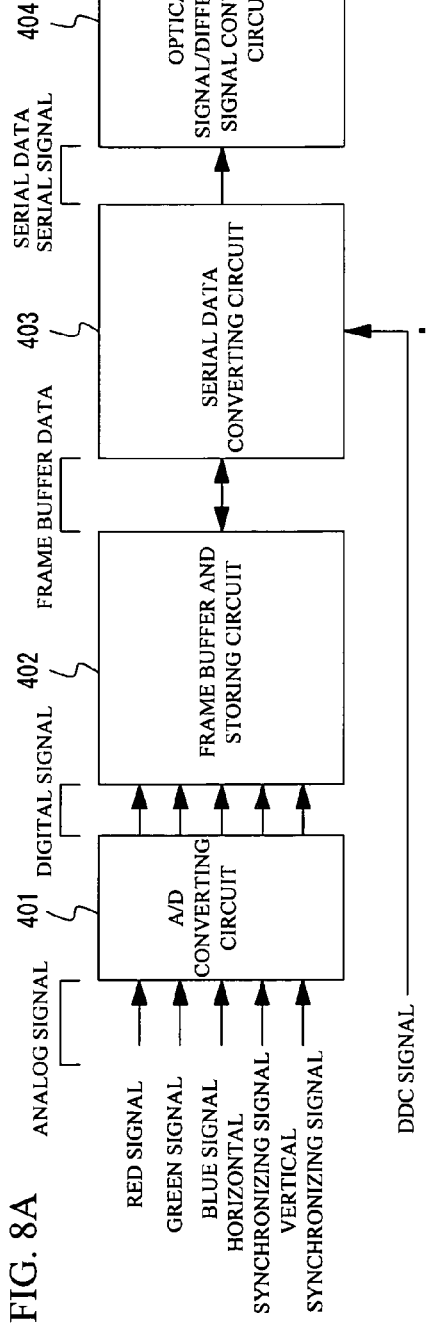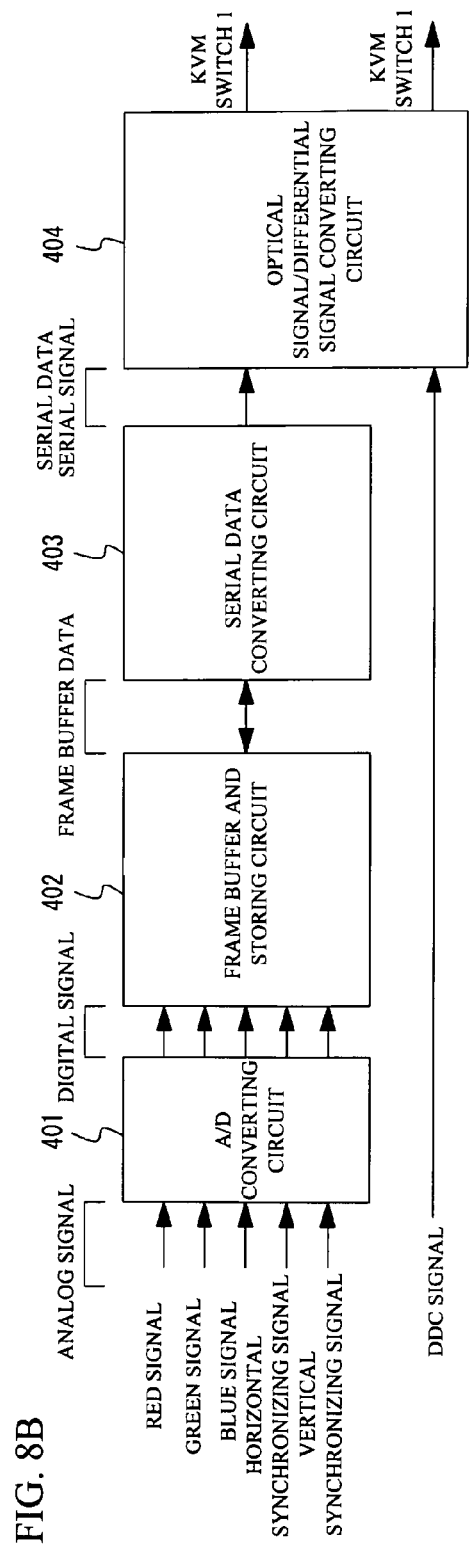

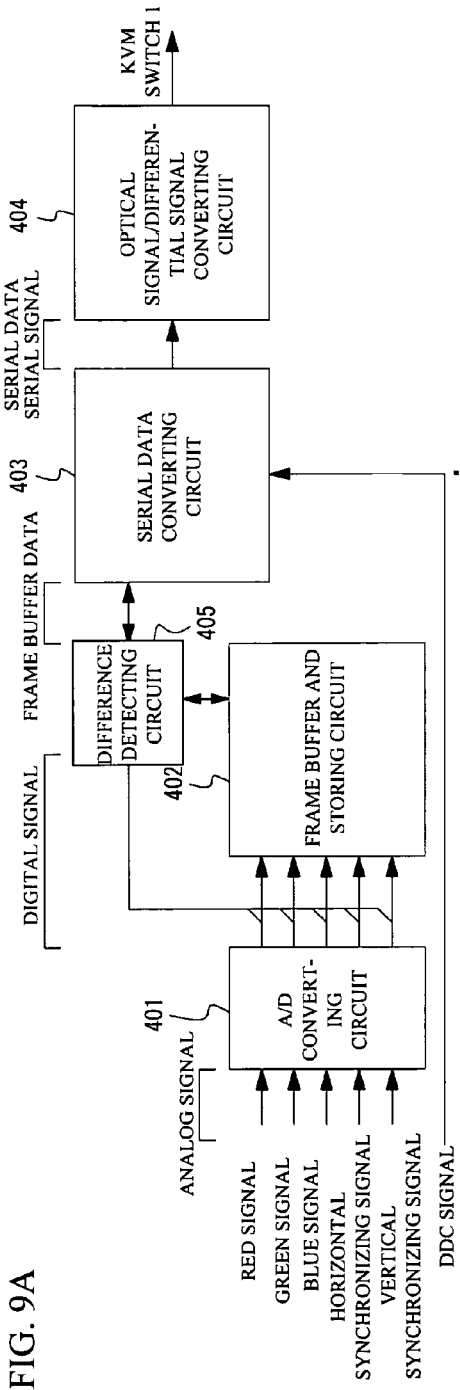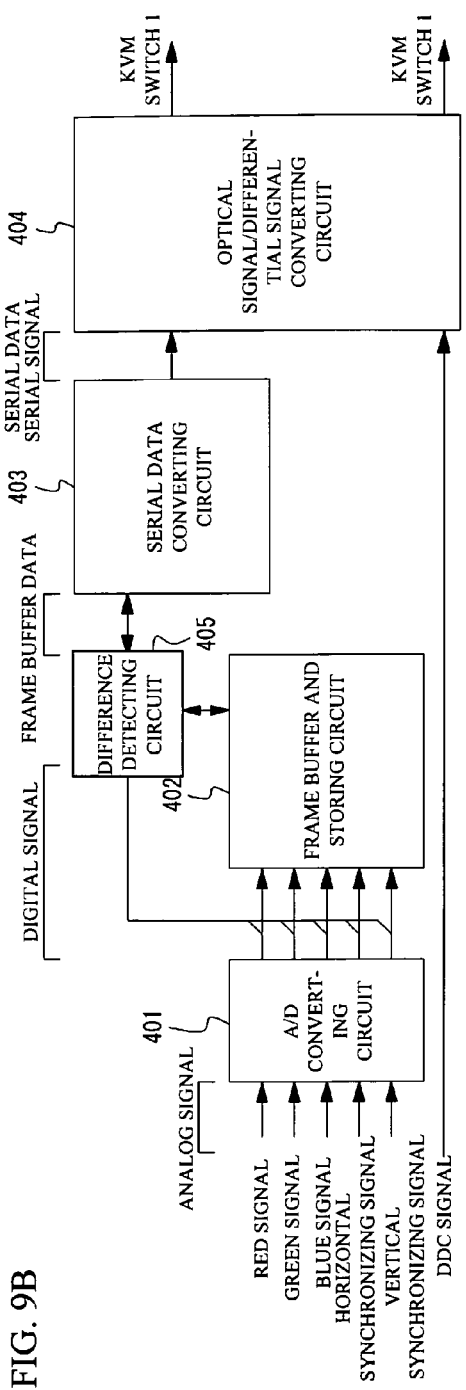
FIG. 9A
FIG. 9B

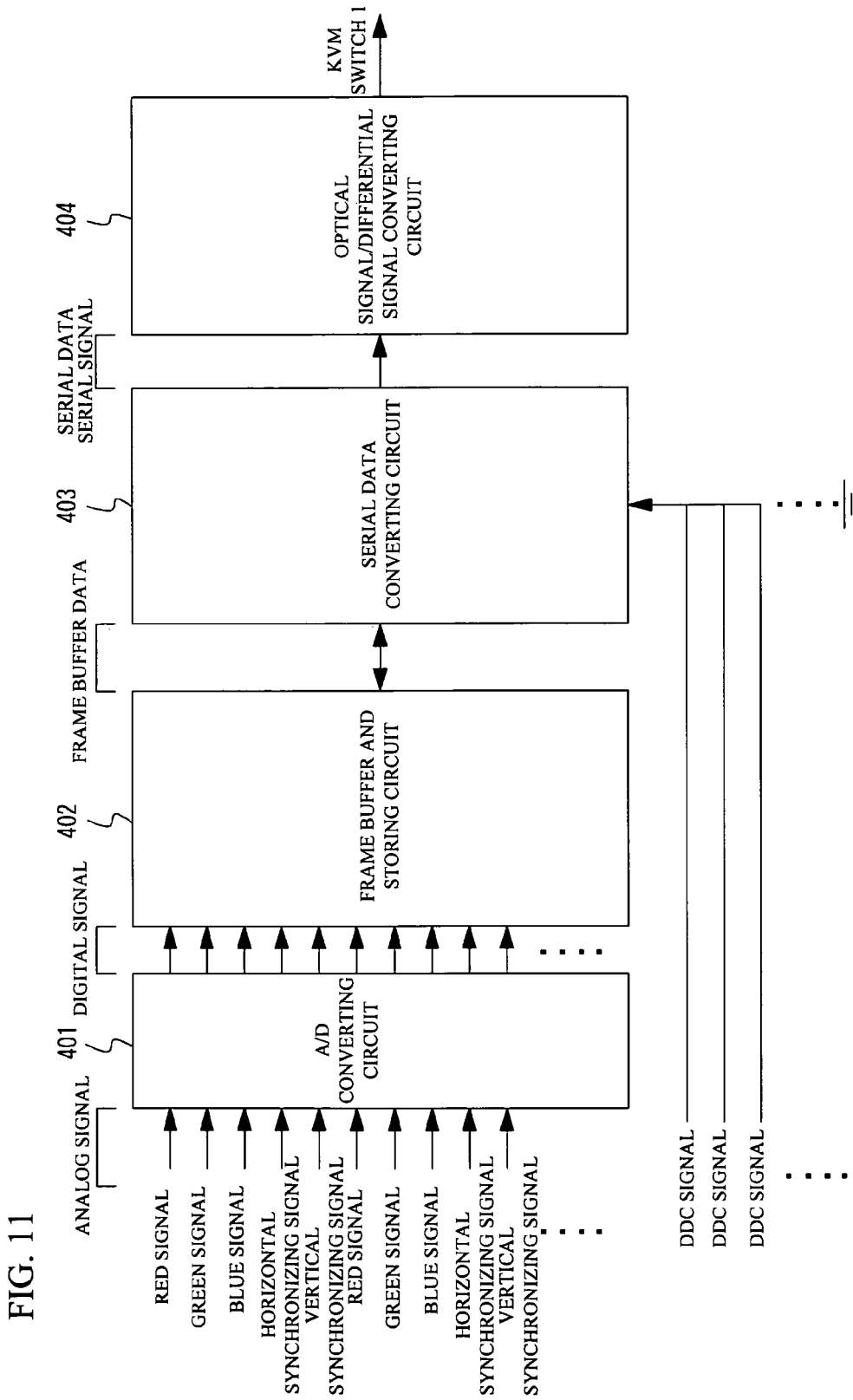

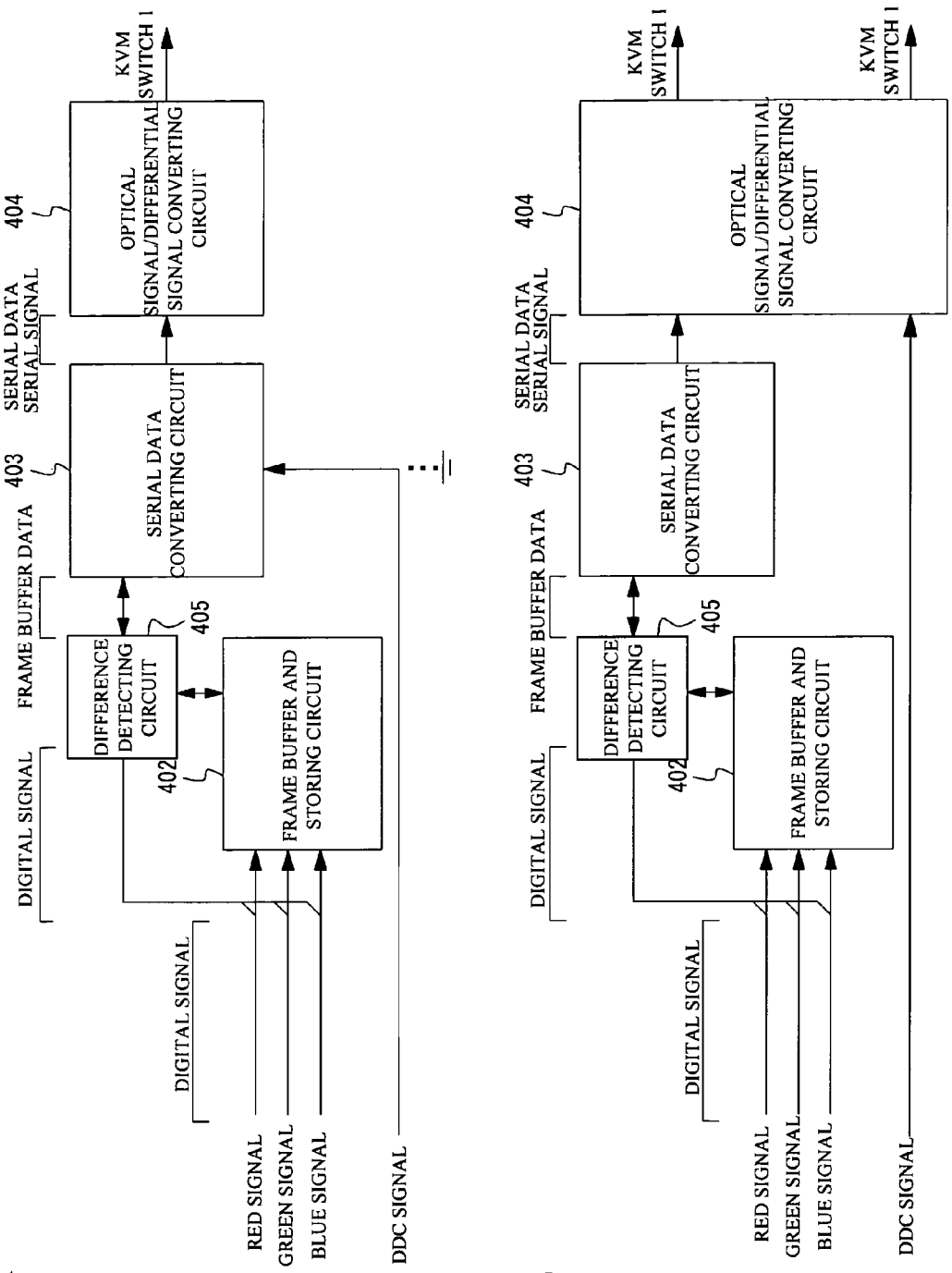

FIG. 17A

| MONITOR NUMBER | REFERENCE MONITOR NUMBER | RELATIVE POSITION (LATERAL DIRECTION) | RELATIVE POSITION (LONGITUDINAL DIRECTION) | WIDTH OF MONITOR | HEIGHT OF MONITOR | RESOLUTION |
|---|---|---|---|---|---|---|
| 1 | 1 | 0 | 0 | 350 | 250 | 1024×768 |
| 2 | 1 | +400 | 0 | 350 | 250 | 1024×768 |
| 3 | 2 | +400 | 0 | 350 | 250 | 1024×768 |
| 4 | 1 | +30 | +350 | 700 | 400 | 1680×1050 |
| 5 | 4 | +900 | +100 | 300 | 300 | 800×640 |

SCREEN FOR INPUTTING ARRANGEMENT OF DISPLAYS

CANCEL  OK

FIG. 17B

| MONITOR NUMBER | ABSOLUTE POSITION (LATERAL DIRECTION) | ABSOLUTE POSITION (LONGITUDINAL DIRECTION) | WIDTH OF MONITOR | HEIGHT OF MONITOR | RESOLUTION |
|---|---|---|---|---|---|
| 1 | 0 | 0 | 350 | 250 | 1024×768 |
| 2 | +400 | 0 | 350 | 250 | 1024×768 |
| 3 | +800 | 0 | 350 | 250 | 1024×768 |
| 4 | +30 | +350 | 700 | 400 | 1680×1050 |
| 5 | +930 | +450 | 300 | 300 | 800×640 |

SCREEN FOR INPUTTING ARRANGEMENT OF DISPLAYS

CANCEL  OK

KVM SWITCH AND KVM SYSTEM

BACKGROUND OF THE INVENTION

1. Field of the Invention

The present invention relates to a KVM switch which is connected between a computer and peripheral devices such as a mouse, a keyboard, and a monitor, as well as a KVM system.

2. Description of the Related Art

Conventionally, there has been known a KVM (K: keyboard, V: video, M: mouse) switch including a terminal emulator which is connected between a plurality of servers and peripheral devices such as a mouse, a keyboard, and a monitor (see U.S. Pat. No. 6,567,869).

The KVM switch converts communication data output from a communication port (e.g. a serial port, a USB (Universal Serial Bus) port, or the like) of selected server into analog video data, and outputs the analog video data to the monitor. That is, the KVM switch can switch the communication data output from one of the plurality of servers to communication data output from another server, and display the switched communication data as an analog image on the monitor.

When the KVM switch is used, video outputs from the plurality of servers are switched, and hence a user cannot watch the pieces of video data together.

Conventionally, there has been known a KVM switch including a module which has a plurality of ports for connecting a plurality of servers (see Japanese Laid-Open Patent Publication No. 2005-18135). The KVM switch has the plurality of modules as described above.

Further, conventionally, there has been known a KVM switch in which a remote-controlling side can operate a computer provided at a local side (see Japanese Laid-Open Patent Publication No. 2007-34376). When the computer is operated from the remote-controlling side, the KVM switch is configured so as to notify the local side at which the computer is provided of the operation from the remote-controlling side to the computer.

However, in U.S. Pat. No. 6,567,869, and Japanese Laid-Open Patent Publication Nos. 2005-18135 and 2007-34376, a single video output from each server is output to a remote terminal by using a KVM switch, and hence a plurality of KVM switches are required to realize a multi-monitor environment.

SUMMARY OF THE INVENTION

It is an object of the present invention to provide a KVM switch and a KVM system which can provide a multi-monitor environment for a user.

According to a first aspect of the present invention, there is provided a KVM switch, comprising: an inputting portion that is capable of inputting a plurality of video signals output from an information processing apparatus; and a transmitting portion that adds the pieces of identification information of the respective corresponding video signals to the plurality of video signals input by the inputting portion, and transmits the plurality of video signals to which the pieces of identification information are added, to a remote terminal via a network.

With the above arrangement, the plurality of video signals are input, the pieces of identification information of the respective corresponding video signals are added to the plurality of video signals, and the plurality of video signals to which the pieces of identification information are added are transmitted to the remote terminal via the network. Therefore, it is possible to provide a multi-monitor environment for a user with a single KVM switch.

Preferably, the KVM switch further includes a storing portion that sequentially stores the plurality of video signals input by the inputting portion as the pieces of video data, and a difference detecting portion that detects difference video data between present video data for one screen and previous video data for one screen with respect to each of the pieces of the sequentially stored video data, wherein the transmitting portion adds the identification information of a corresponding video signal to the detected difference video data, and transmits the difference video data to which the identification information of the corresponding video signal is added, to the remote terminal via the network.

With the above arrangement, the plurality of video signals are sequentially stored as the pieces of video data, difference video data between present video data for one screen and previous video data for one screen with respect to each of the pieces of the video data is detected, the identification information of a corresponding video signal is added to the detected difference video data, and the difference video data to which the identification information of the corresponding video signal is added is transmitted to the remote terminal via the network. Therefore, it is possible to provide a multi-monitor environment for a user with a single KVM switch. Also, since the difference video data is transmitted to the remote terminal, an amount of transmission of data can be reduced.

Preferably, each of the plurality of video signals is any one of an analog signal and a digital signal.

With the above arrangement, any of the analog signal and the digital signal can be handled as each of the plurality of video signals output from the information processing apparatus.

Preferably, the KVM switch further includes an analog-to-digital converting portion that, when at least one of the plurality of video signals is an analog signal, converts the analog signal into a digital signal.

With the above arrangement, it is possible to convert the analog video signal into the digital signal which is less affected by a communication environment.

Preferably, the information processing apparatus includes a plurality of output terminals that outputs the plurality of video signals, the inputting portion is a single input terminal, and a single cable is connected between the plurality of output terminals and the input terminal.

With the above arrangement, the single input terminal inputs the plurality of video signals output from the information processing apparatus. Therefore, the KVM switch can be made compact in size.

Preferably, the information processing apparatus includes a plurality of output terminals that outputs the plurality of video signals, the inputting portion is a plurality of input terminals less than the plurality of output terminals, and each of the plurality of input terminals is connected to a given number of output terminals among the plurality of output terminals via a single cable.

With the above arrangement, each of input terminals is connected to the given number of output terminals among the plurality of output terminals via the single cable, and hence the user can attach or detach the cable more easily than the case where the input terminal and the output terminal are connected with the cable in one-on-one relationship.

More preferably, the cable has the structure in which the number of cores is reduced by deleting a signal which shows attribute information of a display, and is output from each of the plurality of output terminals.

With the above arrangement, it is possible to thin down the cable connected between the input terminal and the output terminal, and to suppress costs of the cable.

Preferably, the KVM switch further includes a plurality of connecting portions that are connected to a plurality of displays, and a switching portion that switches the plurality of video signals which are input from the inputting portion, and are displayed on the displays, respectively.

With the above arrangement, it is possible to switch the plurality of video signals displayed on the displays, respectively.

Preferably, the KVM switch further includes a connecting portion that is connected to a display, and an image processing portion that reduces the plurality of video signals input by the inputting portion, synthesize the reduced video signals with each other, and outputs the synthesized video signal to the display.

With the above arrangement, it is possible to display the plurality of video signals on the single display.

More preferably, the KVM switch further includes a plurality of connecting portions that are connected to a plurality of displays, and an identification information displaying portion that displays the pieces of identification information of the respective corresponding connecting portions on the plurality of displays in response to the depression of a given switch or the input of a given key.

With the above arrangement, the user of the KVM switch side (i.e., local side) can confirm position relationship of the plurality of displays (i.e., multi-monitor).

Still more preferably, the KVM switch further includes a setting portion that sets position relationship of the plurality of displays, wherein the transmitting portion adds the pieces of identification information of the connecting portions and information indicative of the position relationship of the plurality of displays set by the setting portion to the difference video data to which the identification information of the corresponding video signal is added, and transmits the resultant difference video data to the remote terminal via the network, and the remote terminal displays the resultant difference video data based on the pieces of identification information of the connecting portions and the information indicative of the position relationship of the plurality of displays.

With the above arrangement, the arrangement state of the plurality of displays (i.e., multi-monitor) on a local side is restored on a remote terminal side, and hence the user of the remote terminal side can confirm the arrangement state of the plurality of displays (i.e., multi-monitor).

Further preferably, the setting portion further sets information of the size and the resolution of each of the plurality of displays, the transmitting portion adds the pieces of identification information of the connecting portions, the information indicative of the position relationship of the plurality of displays set by the setting portion, and the information of the size and the resolution of each of the plurality of displays to the difference video data to which the identification information of the corresponding video signal is added, and transmits the resultant difference video data to the remote terminal via the network, and the remote terminal displays the resultant difference video data based on the pieces of identification information of the connecting portions, the information indicative of the position relationship of the plurality of displays, and the information of the size and the resolution of each of the plurality of displays.

With the above arrangement, the sizes, the resolutions, and the arrangement state of the plurality of displays (i.e., multi-monitor) on the local side are restored on the remote terminal side, and hence the user of the remote terminal side can confirm the sizes, the resolutions, and the arrangement state of the plurality of displays (i.e., multi-monitor).

According to a second aspect of the present invention, there is provided a KVM system having a plurality of adapters and a KVM switch, comprising: each of the plurality of adapters including: an analog-to-digital converting portion that inputs an analog video signal output from one of a plurality of output terminals included in an information processing apparatus, and converts the analog video signal into a digital video signal; a serial data converting portion that converts the digital video signal into serial data; and an optical signal/differential signal converting portion that converts the serial data into an optical signal or a differential signal, and outputs the optical signal or the differential signal to the KVM switch; the KVM switch including: a storing portion that sequentially stores the optical signal or the differential signal output from each of the plurality of adapters as video data; a difference detecting portion that detects difference video data between present video data for one screen and previous video data for one screen with respect to the sequentially stored video data; and a transmitting portion that adds identification information of a corresponding analog video signal to the detected difference video data, and transmits the difference video data to which the identification information of the corresponding analog video signal is added, to a remote terminal via a network.

With the above arrangement, each of the plurality of adapters converts the analog video signal into the digital optical signal or the digital differential signal, and outputs the digital optical signal or the digital differential signal to the KVM switch. The KVM switch detects the difference of the digital optical signal or the digital differential signal as the video data, adds the identification information of a corresponding video signal to the detected difference video data, and transmits the detected difference video data to which the identification information is added, to the remote terminal via the network. Therefore, it is possible to provide a multi-monitor environment for a user with a single KVM switch. Also, since the difference video data is transmitted to the remote terminal, an amount of transmission of data can be reduced.

Preferably, when a digital video signal is output from each of the plurality of output terminals included in the information processing apparatus, each of the plurality of adapters includes no analog-to-digital converting portion, and the transmitting portion adds identification information of a corresponding digital video signal to the detected difference video data, and transmits the difference video data to which the identification information of the corresponding digital video signal is added, to the remote terminal via the network.

With the above arrangement, even when the digital video signal is output from each of the plurality of output terminals included in the information processing apparatus, it is possible to provide the multi-monitor environment for the user with the single KVM switch. Also, since the difference video data is transmitted to the remote terminal, the amount of transmission of data can be reduced.

Preferably, each of the plurality of adapters includes a signal which shows attribute information of a display and is output from a corresponding output terminal in the optical signal or the differential signal.

With the above arrangement, the signal which shows attribute information of the display can be transmitted to the remote terminal via the KVM switch.

Preferably, each of the plurality of adapters includes no signal which shows attribute information of a display and is output from a corresponding output terminal in the optical signal or the differential signal.

With the above arrangement, it is possible to reduce an amount of the optical signal or the differential signal output to the KVM switch, and to improve the transmission rate of the entire system.

Preferably, each of the plurality of adapters includes no signal which shows attribute information of a display and is output from a corresponding output terminal in the optical signal or the differential signal, and outputs the signal to the KVM switch in an independent form.

With the above arrangement, the signal which shows attribute information of the display can be transmitted to the remote terminal via the KVM switch.

According to a third aspect of the present invention, there is provided a KVM system having an adapter and a KVM switch, comprising: the adapter including: an analog-to-digital converting portion that inputs analog video signals output from a plurality of output terminals included in an information processing apparatus, and converts each of the analog video signals into each of digital video signals; a serial data converting portion that converts each of the digital video signals into serial data; and an optical signal/differential signal converting portion that converts the serial data into an optical signal or a differential signal, and outputs the optical signal or the differential signal to the KVM switch; the KVM switch including: a storing portion that sequentially stores the optical signal or the differential signal as video data; a difference detecting portion that detects difference video data between present video data for one screen and previous video data for one screen with respect to the sequentially stored video data; and a transmitting portion that adds identification information of a corresponding analog video signal to the detected difference video data, and transmits the difference video data to which the identification information of the corresponding analog video signal is added, to a remote terminal via a network.

With the above arrangement, the adapter converts each of the plurality of the analog video signals into the digital optical signal or the digital differential signal, and outputs the digital optical signal or the digital differential signal to the KVM switch. The KVM switch detects the difference of the digital optical signal or the digital differential signal as the video data, adds the identification information of a corresponding video signal to the detected difference video data, and transmits the detected difference video data to which the identification information is added, to the remote terminal via the network. Therefore, it is possible to provide a multi-monitor environment for a user with a single KVM switch. Also, since the difference video data is transmitted to the remote terminal, an amount of transmission of data can be reduced.

Preferably, when the digital video signals are output from the plurality of output terminals included in the information processing apparatus, the adapter includes no analog-to-digital converting portion, and the transmitting portion adds identification information of a corresponding digital video signal to the detected difference video data, and transmits the difference video data to which the identification information of the corresponding digital video signal is added, to the remote terminal via the network.

With the above arrangement, when the digital video signals are output from the plurality of output terminals included in the information processing apparatus, it is possible to provide the multi-monitor environment for the user with the single KVM switch. Also, since the difference video data is transmitted to the remote terminal, the amount of transmission of data can be reduced.

Preferably, the adapter includes a signal which shows attribute information of a display and is output from a corresponding output terminal in the optical signal or the differential signal.

With the above arrangement, the signal which shows attribute information of the display can be transmitted to the remote terminal via the KVM switch.

Preferably, the adapter includes no signal which shows attribute information of a display and is output from a corresponding output terminal in the optical signal or the differential signal.

With the above arrangement, it is possible to reduce an amount of the optical signal or the differential signal output to the KVM switch, and to improve the transmission rate of the entire system.

Preferably, the adapter includes no signal which shows attribute information of a display and is output from a corresponding output terminal in the optical signal or the differential signal, and outputs the signal to the KVM switch in an independent form.

With the above arrangement, the signal which shows attribute information of the display can be transmitted to the remote terminal via the KVM switch.

According to a fourth aspect of the present invention, there is provided a KVM system having a plurality of adapters and a KVM switch, comprising: each of the plurality of adapters including: an analog-to-digital converting portion that inputs an analog video signal output from one of a plurality of output terminals included in an information processing apparatus, and converts the analog video signal into a digital video signal; a storing portion that sequentially stores the digital video signal; a difference detecting portion that detects difference video signal between present video signal for one screen and previous video signal for one screen with respect to the sequentially stored digital video signal; a serial data converting portion that converts the detected difference video signal into serial data; and an optical signal/differential signal converting portion that converts the serial data into an optical signal or a differential signal, and outputs the optical signal or the differential signal to the KVM switch; the KVM switch including: a transmitting portion that adds identification information of a corresponding analog video signal to the optical signal or the differential signal output from each of the plurality of adapters, and transmits the optical signal or the differential signal to which the identification information of the corresponding analog video signal is added, to a remote terminal via a network as video data.

With the above arrangement, each of the plurality of adapters converts the analog video signal into the digital video signal, converts the digital video signal for one screen into the optical signal or the differential signal, and outputs the optical signal or the differential signal to the KVM switch. The KVM switch adds the identification information of the corresponding analog video signal to the optical signal or the differential signal, and transmits the optical signal or the differential signal to which the identification information of the corresponding analog video signal is added, to the remote terminal via the network as video data. Therefore, it is possible to provide a multi-monitor environment for a user with a single KVM switch. Also, since the difference video data is transmitted to the remote terminal, an amount of transmission of data can be reduced.

Preferably, when a digital video signal is output from each of the plurality of output terminals included in the information processing apparatus, each of the plurality of adapters includes no analog-to-digital converting portion, and the transmitting portion adds identification information of a corresponding digital video signal to the detected difference video data, and transmits the difference video data to which the identification information of the corresponding digital video signal is added, to the remote terminal via the network as video data.

With the above arrangement, even when the digital video signal is output from each of the plurality of output terminals included in the information processing apparatus, it is possible to provide the multi-monitor environment for the user with the single KVM switch. Also, since the difference video data is transmitted to the remote terminal, the amount of transmission of data can be reduced.

Preferably, each of the plurality of adapters includes a signal which shows attribute information of a display and is output from a corresponding output terminal in the optical signal or the differential signal.

With the above arrangement, the signal which shows attribute information of the display can be transmitted to the remote terminal via the KVM switch.

Preferably, each of the plurality of adapters includes no signal which shows attribute information of a display and is output from a corresponding output terminal in the optical signal or the differential signal.

With the above arrangement, it is possible to reduce an amount of the optical signal or the differential signal output to the KVM switch, and to improve the transmission rate of the entire system.

Preferably, each of the plurality of adapters includes no signal which shows attribute information of a display and is output from a corresponding output terminal in the optical signal or the differential signal, and outputs the signal to the KVM switch in an independent form.

With the above arrangement, the signal which shows attribute information of the display can be transmitted to the remote terminal via the KVM switch.

According to a fifth aspect of the present invention, there is provided a KVM system having a adapter and a KVM switch, comprising: the adapter including: an analog-to-digital converting portion that inputs analog video signals output from a plurality of output terminals included in an information processing apparatus, and converts each of the analog video signals into each of digital video signals; a storing portion that sequentially stores the digital video signals; a difference detecting portion that detects difference video signal between present video signal for one screen and previous video signal for one screen with respect to each of the sequentially stored digital video signals; a serial data converting portion that converts each of the detected difference video signals into serial data; and an optical signal/differential signal converting portion that converts the serial data into an optical signal or a differential signal, and outputs the optical signal or the differential signal to the KVM switch; the KVM switch including: a transmitting portion that adds identification information of a corresponding analog video signal to the optical signal or the differential signal output from the adapter, and transmits the optical signal or the differential signal to which the identification information of the corresponding analog video signal is added, to a remote terminal via a network as video data.

With the above arrangement, the adapter converts each of the plurality of analog video signals into the digital video signal, converts the digital video signal for one screen into the optical signal or the differential signal, and outputs the optical signal or the differential signal to the KVM switch. The KVM switch adds the identification information of the corresponding analog video signal to the optical signal or the differential signal, and transmits the optical signal or the differential signal to which the identification information of the corresponding analog video signal is added, to the remote terminal via the network as video data. Therefore, it is possible to provide a multi-monitor environment for a user with a single KVM switch. Also, since the difference video data is transmitted to the remote terminal, an amount of transmission of data can be reduced.

Preferably, when the digital video signals are output from the plurality of output terminals included in the information processing apparatus, the adapter includes no analog-to-digital converting portion, and the transmitting portion adds identification information of a corresponding digital video signal to the detected difference video data, and transmits the difference video data to which the identification information of the corresponding digital video signal is added, to the remote terminal via the network.

With the above arrangement, even when the digital video signals are output from the plurality of output terminals included in the information processing apparatus, it is possible to provide the multi-monitor environment for the user with the single KVM switch. Also, since the difference video data is transmitted to the remote terminal, the amount of transmission of data can be reduced.

Preferably, the adapter includes a signal which shows attribute information of a display and is output from a corresponding output terminal in the optical signal or the differential signal.

With the above arrangement, the signal which shows attribute information of the display can be transmitted to the remote terminal via the KVM switch.

Preferably, the adapter includes no signal which shows attribute information of a display and is output from a corresponding output terminal in the optical signal or the differential signal.

With the above arrangement, it is possible to reduce an amount of the optical signal or the differential signal output to the KVM switch, and to improve the transmission rate of the entire system.

Preferably, the adapter includes no signal which shows attribute information of a display and is output from a corresponding output terminal in the optical signal or the differential signal, and outputs the signal to the KVM switch in an independent form.

With the above arrangement, the signal which shows attribute information of the display can be transmitted to the remote terminal via the KVM switch.

Preferably, the KVM switch further comprises a plurality of connecting portions that are connected to a plurality of displays, and a switching portion that switches the plurality of video signals which are output from the plurality of output terminals included in the information processing apparatus, and are displayed on the displays, respectively.

With the above arrangement, it is possible to switch the plurality of video signals displayed on the displays, respectively.

Preferably, the KVM switch further comprises a connecting portion that is connected to a display, and an image processing portion that reduces the plurality of video signals output from the plurality of output terminals included in the information processing apparatus, synthesize the reduced video signals with each other, and outputs the synthesized video signal to the display.

With the above arrangement, it is possible to display the plurality of video signals on the single display.

BRIEF DESCRIPTION OF THE DRAWINGS

Preferred embodiments of the present invention will be described in detail with reference to the following drawings, wherein:

FIG. 8A is a block diagram showing the configuration of each of adapters 310-N;

FIG. 8B is a block diagram showing a first variation of the configuration of each of the adapters 310-N;

FIG. 9A is a block diagram showing a second variation of the configuration of each of the adapters 310-N;

FIG. 9B is a block diagram showing a third variation of the configuration of each of the adapters 310-N;

FIG. 11 is a diagram showing the configuration of an adapter 311 that adopts the configuration similar to the adapter 310-N in FIG. 8A;

FIG. 13A is a block diagram showing a second variation of the configuration of each of the adapters 310-N when the video signal is the digital signal;

FIG. 13B is a block diagram showing a third variation of the configuration of each of the adapters 310-N when the video signal is the digital signal;

FIG. 17A is a diagram showing a first example of a GUI which sets the arrangement relationship of the monitors in FIG. 16; and FIG. 17B is a diagram showing a second example of the GUI which sets the arrangement relationship of the monitors in FIG. 16.

DESCRIPTION OF THE PREFERRED EMBODIMENTS

A description will now be given, with reference to the accompanying drawings, of an embodiment of the present invention.

Figure 1:
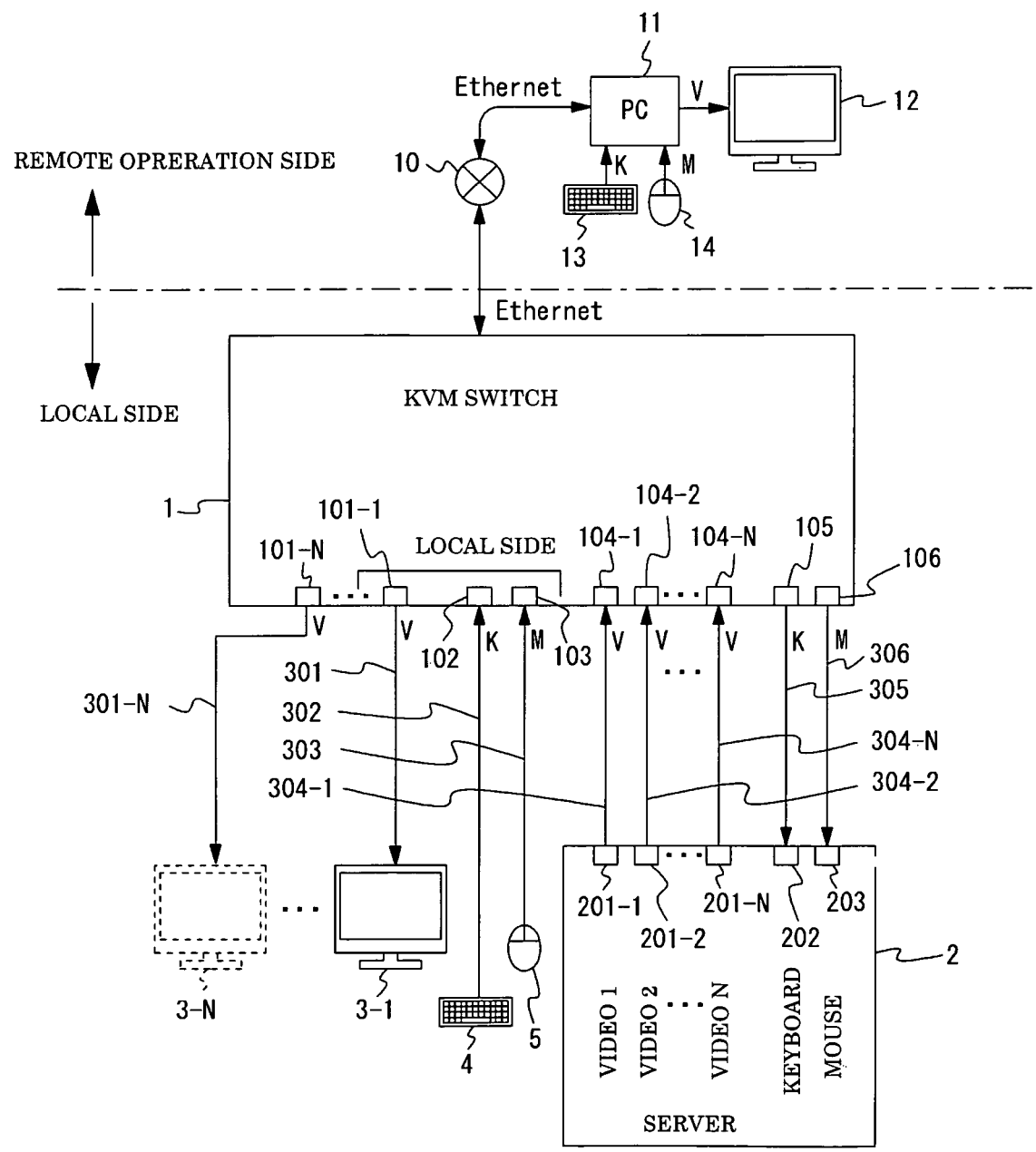
FIG. 1 is a diagram showing the overall configuration of a switching system for a multi-monitor including a KVM switch 1.

FIG. 1 is a diagram showing the overall configuration of a switching system for a multi-monitor including a KVM switch 1.

As shown in FIG. 1, the switching system for the multi-monitor is provided with a KVM switch (K: keyboard, V: video, M: mouse) 1, a server 2, monitors 3-N (N is an integer equal to or larger than 1, i.e., N=1, 2, . . . ), a keyboard 4, and a mouse 5. The server 2 is a computer (a computer of a local side) to be operated. The number of servers is not limited to one, and a plurality of servers may be included in the switching system for the multi-monitor.

Further, the switching system for the multi-monitor includes a PC 11 to which a monitor 12, a keyboard 13, and a mouse 14 are connected. The PC 1 is a computer which is operated at a remote place by a user, and a remote terminal connected to the KVM switch 1 via a network 10. The number of remote terminals is not limited to one, and a plurality of remote terminals may be included in the switching system for the multi-monitor.

The server 2 and the PC 11 have the configuration of a common computer (for example, a CPU, a memory, a hard disk, a network interface, a CD-ROM drive, and a plurality of terminals connecting the monitors, the keyboard 13 and the mouse 14).

The KVM switch 1 includes: video terminals 101-N (N is an integer equal to or larger than 1 and the following N is similar to this) (a connecting portion) that output video signals to the monitors 3-N; a PS/2 terminal 102 that inputs a keyboard signal output when at least one of keys on the keyboard 4 is depressed; a PS/2 terminal 103 that inputs a mouse signal caused by the movement and the click of the mouse 5; video terminals 104-N (an inputting portion) that input a plurality of video signals from the server 2; a PS/2 terminal 105 that outputs the keyboard signal to the server 2; and a PS/2 terminal 106 that outputs the mouse signal to the server 2.

The sever 2 includes: video terminals 201-N that output video signals to the video terminals 104-N; a PS/2 terminal 202 that inputs the keyboard signal; and a PS/2terminal 203 that inputs the mouse signal.

When the keyboard 4 and the mouse 5 have USB (Universal Serial Bus) terminals, the KVM switch 1 has two USB terminals on behalf of the PS/2 terminals 102 and 103, or in addition to the PS/2 terminals 102 and 103. The PS/2 terminals 105, 106, 202 and 203 may also be composed of USB terminals.

In FIG. 1, a symbol "K" represents the keyboard signal, a symbol "M" represents the mouse signal, and a symbol "V" represents the video signal.

Video cables 301-N are connected between the monitors 3-N and the video terminals 101-N. A cable 302 extending from the keyboard 4 is connected to the PS/2 terminal 102, and a cable 303 extending from the mouse 5 is connected to the PS/2 terminal 103. Video cables 304-N are connected between the video terminals 104-N and the video terminals 201-N. Cables are connected between the PS/2 terminal 105 and the PS/2 terminal 202, and between the PS/2 terminal 106 and the PS/2 terminal 203, respectively.

Figure 2:
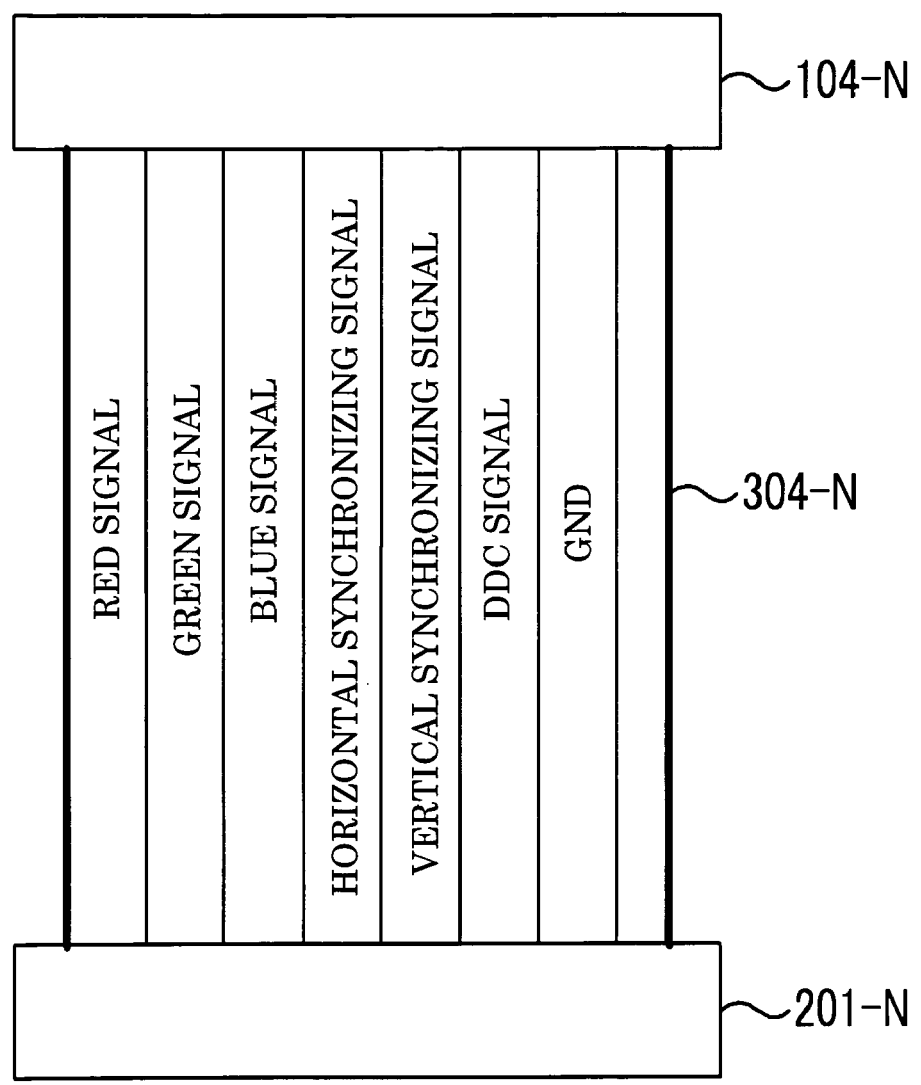
FIG. 2 is a diagram showing the configuration of a video cable 304-N (N is an integer equal to or larger than 1, i.e., N=1,2, . . . )

As shown in FIG. 2, one of the video cables 304-N accommodates seven signal lines for a red signal, a blue signal, a green signal, a horizontal synchronizing signal (Hsync), a vertical synchronizing signal (Vsync), a DDC (Display Data Channel) signal (i.e., a signal showing attribution information of the monitor (e.g., a vendor name, a model number, a resolution or the like)), and a ground (GND) in total. The signals flowing on one of the video cables 304-N are the red signal, the blue signal, the green signal, the horizontal synchronizing signal (Hsync), the vertical synchronizing signal (Vsync), and the DDC signal. Although there is the signal line for the ground (GND), a signal does not flow on the signal line for the ground (GND). In this case, the number of cores included in each of the video terminals 201-N, and the number of cores included in each of the video terminals 104-N are seven, respectively.

A plurality of signal lines for the DDC signals may be contained in each of the video cables 304-N. The signal line for the DDC signal is not contained in each of the video cables 304-N, and the signal line for the DDC signal may be connected between the server 2 and the KVM switch 1 differently. In this case, the terminals to connect the signal line for the DDC signal are required for the server 2 and the KVM switch 1.

The video signal output from the server 2 to the KVM switch 1 is a digital signal (e.g., a differential signal of DVI (Digital Visual Interface) type or HDMI (High-Definition Multimedia Interface) type) besides the analog RGB signal as described above. When the video signal output from the server 2 to the KVM switch 1 is the differential signal of DVI type or HDMI type, the video terminals 104-N and the video terminals 201-N have DVI terminals or HDMI terminals.

In FIG. 1, when data is output from the server 2 to the PC 11, a line (Ethernet) connected with the KVM switch 1 is used. However, this line is only one. Therefore, the KVM switch 1 adds identification information to identify the video signal to data output from the KVM switch 1 to the Ethernet (i.e., data into which the video signal output from the server 2 to the KVM switch 1 is converted). Accordingly, the PC 11 of the remote operation side can accurately reproduce the video signal.

When a monitor connected with the PC 11 is only the monitor 12, as many windows as the video signals output from the server 2 to the KVM switch 1 are displayed on the screen of the monitor 12, and the video signals are displayed on the windows, so that the multi-monitor environment is provided for the user. When the number of monitors connected to the PC 11 is the same as the number of video signals output from the server 2 to the KVM switch 1, each of the video signals is displayed on each of the monitors to thereby provide the multi-monitor environment for the user.

Figure 3:
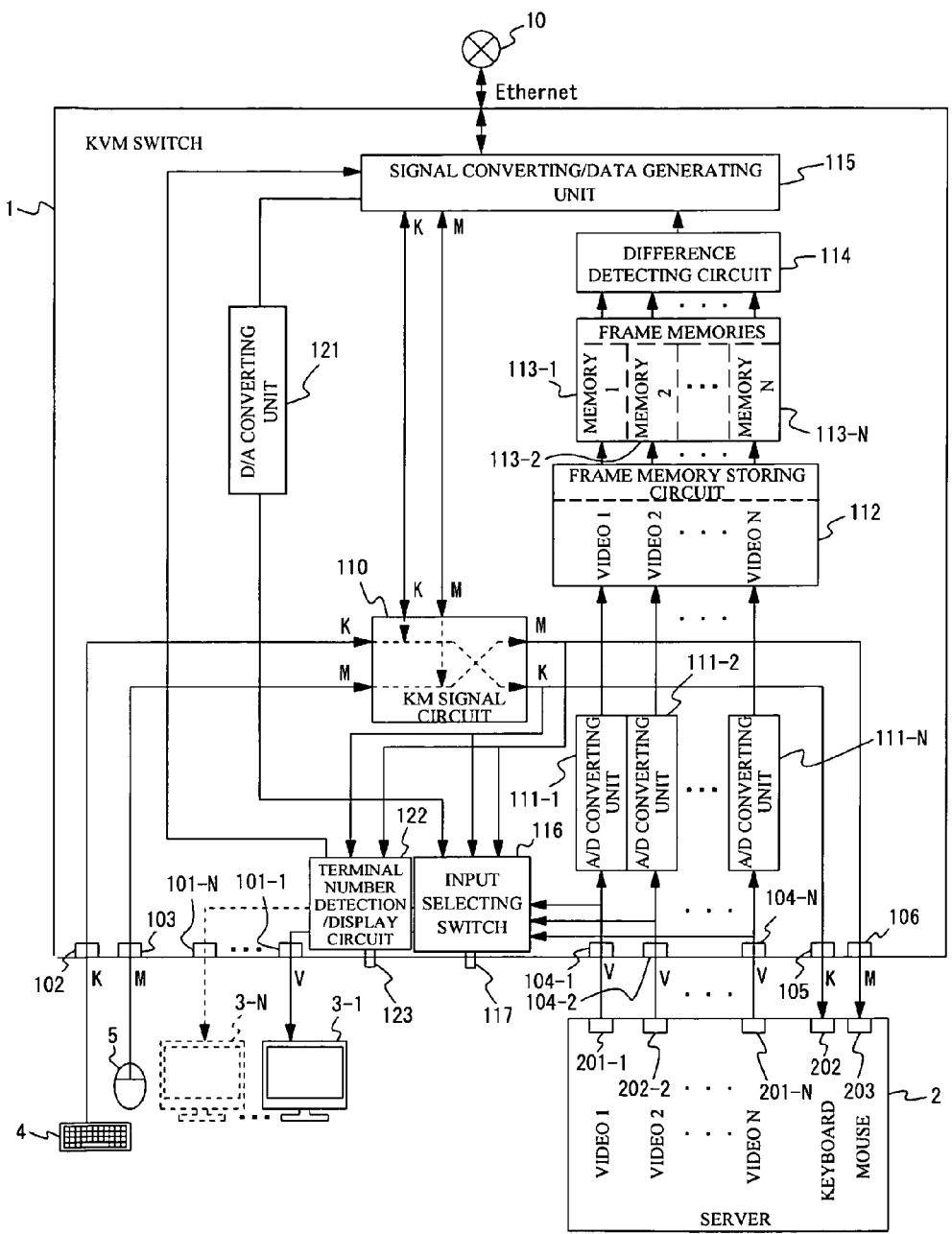
FIG. 3 is a diagram showing the detailed configuration of the KVM switch 1.

FIG. 3 is a diagram showing the detailed configuration of the KVM switch 1.

The KVM switch 1 includes a KM signal circuit 110, A/D converting units 111-N (an A/D converting portion), a frame memory storing circuit 112, frame memories 113-N (a storing portion), a difference detecting circuit 114 (a difference detecting portion), a signal converting/data generating unit 115 (a transmitting portion), an input selecting circuit 116 (a switching portion), an input selecting switch 117 (a switching portion), a D/A converting unit 121, and a terminal number detection/display circuit 122.

The keyboard signal from the keyboard 4 and the mouse signal from the mouse 5 are transmitted to the KM signal circuit 110 via the server 2. Data showing the keyboard signal and data showing the mouse signal which are output from the PC 11 as the remote terminal (not shown) are converted into the keyboard signal and the mouse signal by the signal converting/data generating unit 115, respectively, and the converted keyboard signal and the converted mouse signal are transmitted to the server 2 via the KM signal circuit 110.

Each of the video signals from the server 2 is input to the corresponding A/D converting unit 111-N, and is converted from the analog signal to the digital signal. When each of the video signals from the server 2 is the analog signal, the A/D converting units 111-N included in the KVM switch 1 are unnecessary.

The converted digital signal is transmitted from one of the A/D converting units 111-N to the frame memory storing circuit 112 as video data, and the frame memory storing circuit 112 sequentially stores the video data into the frame memories 113-N. The difference detecting circuit 114 compares previous video data and present video data stored into the frame memories 113-N with each other, detects the change parts (differences) between the pieces of the video data, and transmits the detected differences between the pieces of the video data to the signal converting/data generating unit 115. Since the detected differences between the pieces of the video data do not exist in an initial state, the difference detecting circuit 114 transmits all of the video data to the signal converting/data generating unit 115. The differences between the pieces of the video data include position information showing the change parts and color plane information showing a changed color plane.

The signal converting/data generating unit 115 adds the identification information of the video signal to the differences between the pieces of the video data, and outputs the differences with the identification information to the PC 11. The reason to add the identification information of the video signal is to identify which video signal corresponds to the differences when the PC 11 receives the differences between the pieces of the video data from KVM switch 1. The identification information of the video signal is automatically decided depending on the turn in which the signal converting/data generating unit 115 reads out the differences between the pieces of the video data.

The input selecting circuit 116 switches the video signal displayed on one or more monitors 3-N according to the operation of the input selecting switch 117. When the monitor 3-N connected with the video terminal 101-N is one, the input selecting circuit 116 switches one of the video terminals 104-N inputting the video signal from the server 2 to the other one of the video terminals 104-N, and hence the video signal input from the other one of the video terminals 104-N is displayed on the monitor 3-N. When the number of video terminals 101-N is the same as the number of monitors 3-N, the switching of the video signal is unnecessary. Therefore, the input selecting circuit 116 becomes unnecessary.

The input selecting circuit 116 may switches the video signal displayed on one or more monitors 3-N according to a given keyboard signal (e.g., a keyboard signal of an "F1" key on the keyboard 4) received from the keyboard 4. When the input selecting circuit 116 receives a given keyboard signal (e.g., a keyboard signal of an "F2" key on the keyboard 4) from the keyboard 4, causes one of the monitors 3-N to display a menu screen, and may switch the video signal displayed on one or more monitors 3-N according to a menu selected by the mouse 5.

The terminal number detection/display circuit 122 detects the number(s) of the video terminals 101-N to which one or more monitors 3-N is/are connected, displays the detected number(s) on corresponding monitors 3-N, outputs the detected number(s) to the signal converting/data generating unit 115. The D/A converting unit 121 converts in a digital-to-analog (D/A) type, information such as the size of each of the monitors, the resolution of each of the monitors, the coordinates of each of the monitors, and the number of the video terminal 101-N to which each of the monitors is connected (hereinafter referred to as "the monitor number"), which are set in the signal converting/data generating unit 115. Here, the D/A-converted information is displayed on any monitor via the input selecting circuit 116 and the frame memory storing circuit 112, and is used when the user sets or changes the size of each of the monitors, the resolution of each of the monitors, the coordinates of each of the monitors, the number of the video terminal 101-N to which each of the monitors is connected, or the like.

The terminal number detection/display circuit 122 has a switch 123. When the switch 123 is depressed or a combination of certain keys (e.g., "shift" and "A") on the keyboard 4 is input, the terminal number detection/display circuit 122 detects the number(s) of the video terminals 101-N to which one or more monitors 3-N is/are connected, and displays the detected number(s) on corresponding monitors 3-N. Therefore, the user of the local side can confirm a position relationship of the multi-monitor.

Although the signal converting/data generating unit 115 adds the identification information of the video signal to the differences between the pieces of the video data, and outputs the differences with the identification information to the PC 11, the signal converting/data generating unit 115 may add the information such as the size of each of the monitors, the resolution of each of the monitors, the coordinates of each of the monitors, and the number of the video terminal 101-N to which each of the monitors is connected (hereinafter referred to as "the monitor number") in addition to the identification information of the video signal to the differences between the pieces of the video data, and output the differences with the added information to the PC 11. The PC 11 outputs the differences between the pieces of the video data to the screen of the monitor 12 based on the added information, so that the state of the multi-monitor on the local side is restored. As a result, the user of the remote operation side can confirm the state of the multi-monitor on the local side. Further, the PC 11 outputs a command that inquires the size of each of the monitors, the resolution of each of the monitors, the coordinates of each of the monitors, or the monitor number of the signal converting/data generating unit 115, receives the response, and outputs the response to the monitor 12. According to this, the user of the remote operation side can confirm the state of the multi-monitor on the local side.

Figure 14:
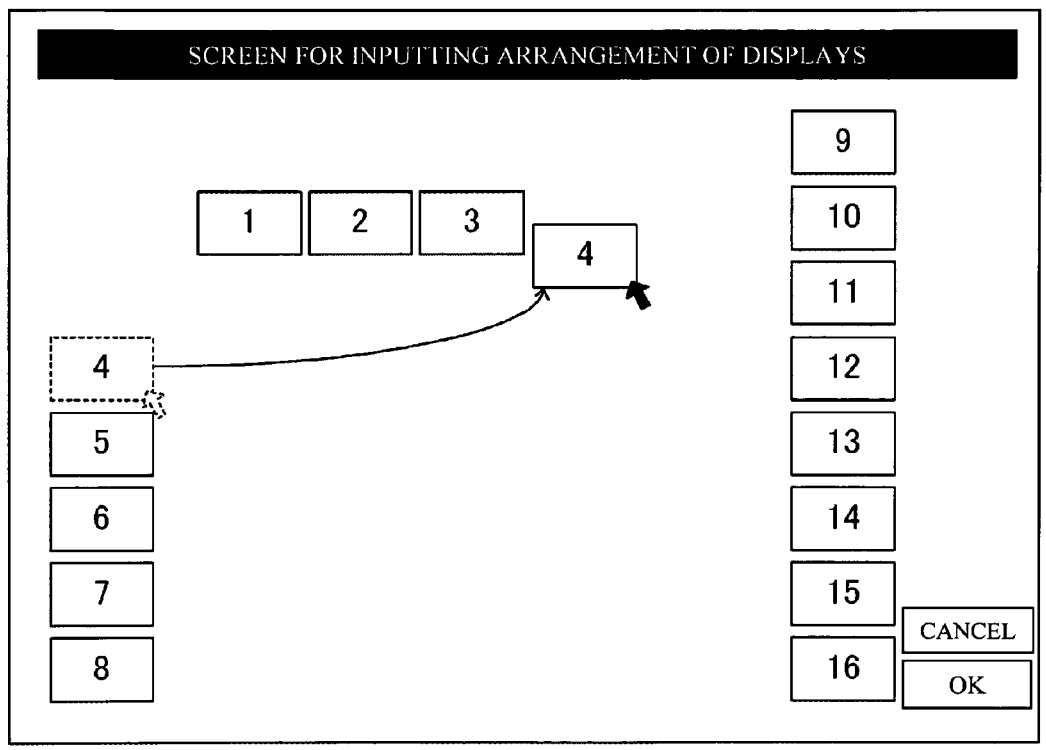
FIG. 14 is a diagram showing a first example of a GUI which sets the arrangement relationship of monitors.

FIG. 14 is a diagram showing a first example of a GUI (Graphical User Interface) which sets the arrangement relationship of the monitors. A program displaying the GUI is stored into the signal converting/data generating unit 115. When the user of the local side inputs a combination of certain keys (e.g., "shift"and "G") on the keyboard 4 to the KVM switch 1, the GUI in FIG. 14 is displayed on the monitor 3-N used by the user. The GUI can easily decide or change the layouts (arrangements) of the monitors with a cursor of the mouse 5. When the layouts (arrangements) of the monitors are changed on the GUI, coordinate data of the monitors set in the signal converting/data generating unit 115 is updated. When the input or the change of the layouts (arrangements) of the monitors is finished, the signal converting/data generating unit 115 adds the identification information of the video signal, the monitor numbers, and the coordinate data of each of the monitors to the differences between the pieces of the video data, and outputs the differences with the added information to the PC 11. The PC 11 changes the layouts of the multi-monitor on the local side displayed on the screen of the monitor 12, based on the monitor numbers, and the coordinate data of each of the monitors. The signal converting/data generating unit 115 may output size data of each of the monitors in addition to on the monitor numbers, and the coordinate data of each of the monitors to the PC 11.

Figure 15:
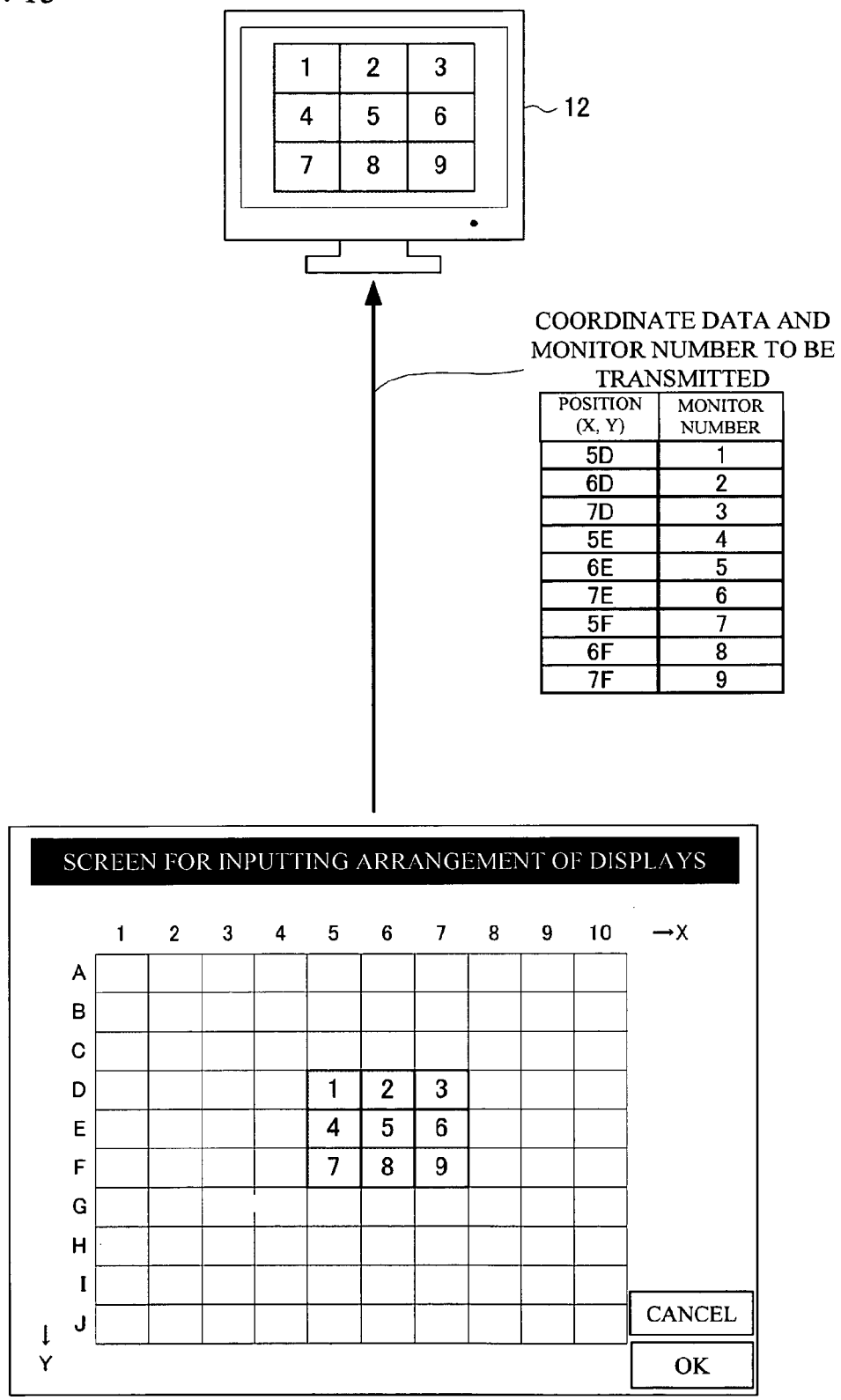
FIG. 15 is a diagram showing a second example of the GUI which sets the arrangement relationship of monitors.

FIG. 15 is a diagram showing a second example of the GUI which sets the arrangement relationship of the monitors. A program displaying the GUI is also stored into the signal converting/data generating unit 115. In the GUI, the monitor numbers are input to virtual areas, so that the arrangements of the monitors are indicated. When the input or the change of the layouts (arrangements) of the monitors is finished, the signal converting/data generating unit 115 adds the identification information of the video signal, the monitor numbers, and the coordinate data of each of the monitors to the differences between the pieces of the video data, and outputs the differences with the added information to the PC 11. The PC 11 changes the layouts of the multi-monitor on the local side displayed on the screen of the monitor 12, based on the monitor numbers, and the coordinate data of each of the monitors.

When the GUI in FIG. 14 or FIG. 15 is used, in the remote operation side, a plurality of windows corresponding to the number and the positions of monitors on the local side are displayed on the monitor 12, each video signal is displayed on each of the plurality of windows, and hence the multi-monitor environment is provided for the user. However, when the number and the sizes of monitors connected to the PC 11 is the same as those of monitors on the local side, each monitor connected to the PC 11 may display each video signal to provide the multi-monitor environment for the user.

Figure 16:
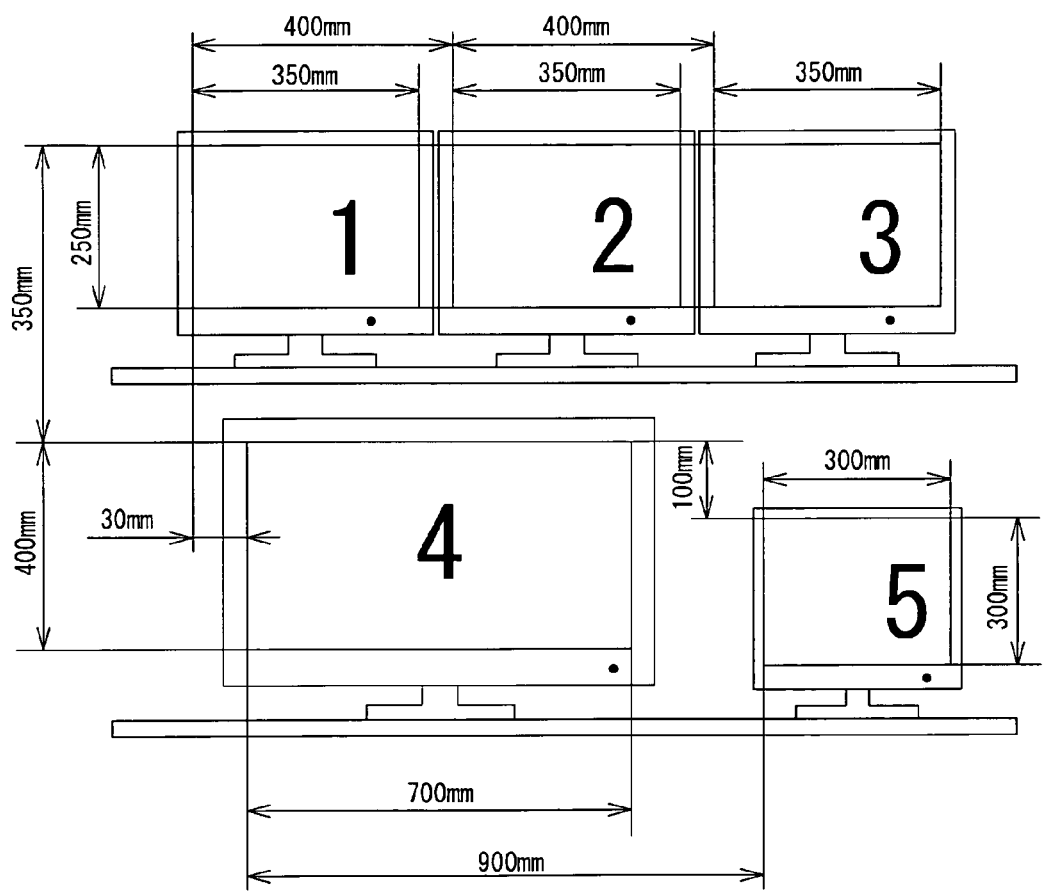
FIG. 16 is a diagram showing an example of a plurality of monitors which are connected to video terminals 101-N and are arranged in a rack.

FIG. 16 is a diagram showing an example of the plurality of monitors which are connected to the video terminals 101-N and are arranged in a rack, FIG. 17A is a diagram showing a first example of a GUI which sets the arrangement relationship of the monitors in FIG. 16, and FIG. 17B is a diagram showing a second example of the GUI which sets the arrangement relationship of the monitors in FIG. 16.

Programs displaying the GUIs in FIGS. 17A and 17B are also stored into the signal converting/data generating unit 115.

In FIG. 17A, the position of each monitor is specified at a relative position to the monitor having a different reference for each monitor. In the GUI of FIG. 17A, monitor numbers, reference monitor numbers, positions of the monitors (specifically, relative positions (lateral direction), and relative positions (longitudinal direction)), sizes of the monitors (specifically, widths of the monitors, and heights of the monitors), and resolutions of the monitors are input, and corresponding data set in the signal converting/data generating unit 115 is updated based on the input information. Further, the signal converting/data generating unit 115 adds the identification information of the video signal, the monitor numbers, the reference monitor numbers, the positions of the monitors (specifically, the relative positions (the lateral direction), and the relative positions (the longitudinal direction)), the sizes of the monitors (specifically, the widths of the monitors, and the heights of the monitors), and the resolutions of the monitors to the differences between the pieces of the video data, and outputs the differences with the added information to the PC 11. The PC 11 changes the layouts, sizes and resolutions of the multi-monitor on the local side based on the monitor numbers, the reference monitor numbers, the positions of the monitors (specifically, the relative positions (the lateral direction), and the relative positions (the longitudinal direction)), the sizes of the monitors (specifically, the widths of the monitors, and the heights of the monitors), and the resolutions of the monitors. Therefore, in the remote operation side, a arrangement state of the multi-monitor on the local side is restored, and the user of the remote operation side can confirm the arrangement state of the multi-monitor on the local side.

In FIG. 17B, the position of each monitor is specified at a absolute position to a reference monitor (here, it is a monitor 1). In the GUI of FIG. 17B, monitor numbers, positions of the monitors (specifically, absolute positions (lateral direction), and absolute positions (longitudinal direction)), sizes of the monitors (specifically, widths of the monitors, and heights of the monitors), and resolutions of the monitors are input, and corresponding data set in the signal converting/data generating unit 115 is updated based on the input information. Although the reference of the absolute position of the monitors is coordinates of an upper left corner on the screen of the monitor number 1, for example, the reference of the absolute position of the monitors is limited to this.

The signal converting/data generating unit 115 adds the identification information of the video signal, the monitor numbers, the positions of the monitors (specifically, the absolute positions (the lateral direction), and the absolute positions (the longitudinal direction)), the sizes of the monitors (specifically, the widths of the monitors, and the heights of the monitors), and the resolutions of the monitors to the differences between the pieces of the video data, and outputs the differences with the added information to the PC 11. The PC 11 changes the layouts, sizes and resolutions of the multi-monitor on the local side based on the monitor numbers, the positions of the monitors (specifically, the absolute positions (the lateral direction), and the absolute positions (the longitudinal direction)), the sizes of the monitors (specifically, the widths of the monitors, and the heights of the monitors), and the resolutions of the monitors. Therefore, in the remote operation side, a arrangement state of the multi-monitor on the local side is restored, and the user of the remote operation side can confirm the arrangement state of the multi-monitor on the local side.

When the GUI in FIG. 17A or FIG. 17B is used, in the remote operation side, a plurality of windows corresponding to the number, the sizes and the positions of monitors on the local side are displayed on the monitor 12, each video signal is displayed on each of the plurality of windows, and hence the multi-monitor environment is provided for the user. However, when the number and the sizes of monitors connected to the PC 11 is the same as those of monitors on the local side, each monitor connected to the PC 11 may display each video signal to provide the multi-monitor environment for the user.

Although a program displaying the GUI in FIG. 14, FIG. 15, FIG. 17A, or FIG. 17B is stored into the signal converting/data generating unit 115, application software including the program may be stored into the server 2. In this case, the user of the local side or the remote operation side accesses the server 2 via the KVM switch 1, and launches the application software, so that the GUI in FIG. 14, FIG. 15, FIG. 17A, or FIG. 17B is displayed on any monitor of the local side or the remote operation side, and the user can set or change the position and the resolution of each monitor. When an OS of the server 2 is "windows (Microsoft Corporation)", the above-mentioned application software can acquire position information of each monitor held by the OS (e.g., the application software can acquire the position information of each monitor from a property of each monitor).

Figure 4:
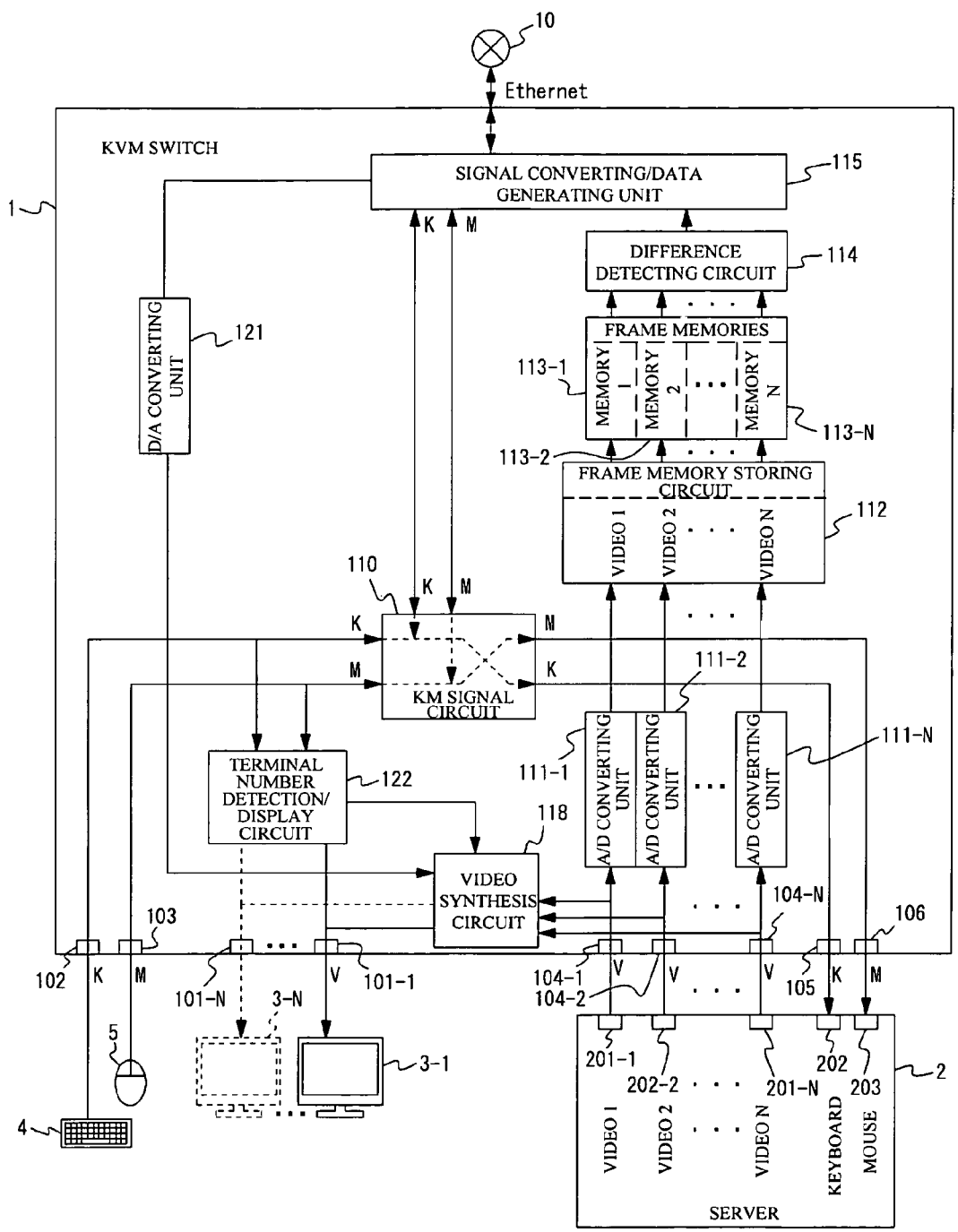
FIG. 4 is a diagram showing a variation of the configuration of the KVM switch 1 in FIG. 3.

FIG. 4 is a diagram showing a variation of the configuration of the KVM switch 1 in FIG. 3.

The KVM switch 1 in FIG. 4 includes a video synthesis circuit 118 (an image processing portion) on behalf of the input selecting circuit 116, and the input selecting switch 117.

The video synthesis circuit 118 generates reduced screens based on respective video signals input from the video terminals 101-N, synthesizes all the reduced screens to accommodate them on the screen of the monitor 3-1, and outputs data of the synthesized and reduced screens to the monitor 3-1. Therefore, the monitor 3-1 can display the plurality of video signals at the same time.

In FIG. 4, the KVM switch 1 includes a single video terminal 101-N, and there is a single monitor on the local side. However, when the KVM switch 1 includes a plurality of video terminals 101-N, the number of monitors on the local side is not limited to one. When there are a plurality of monitors on the local side, the video synthesis circuit 118 may output the data of the synthesized and reduced screens to each of the monitors.

Figure 5:
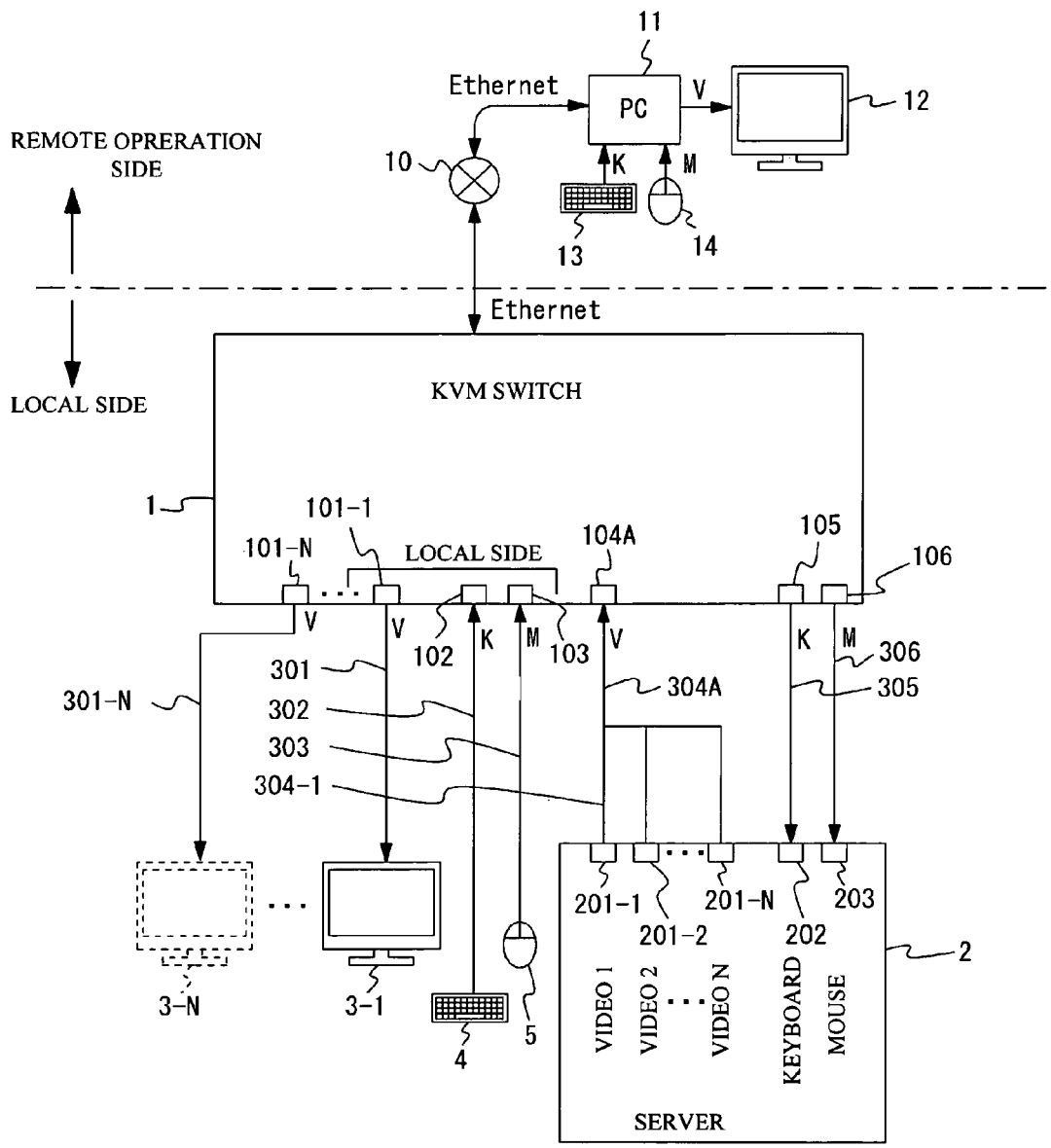
FIG. 5 is a diagram showing a first variation of the switching system for the multi-monitor in FIG. 1.

FIG. 5 is a diagram showing a first variation of the switching system for the multi-monitor in FIG. 1.

In FIG. 5, the KVM switch 1 includes a video terminal 104A on behalf of the video terminals 104-N in FIG. 1. A video cable 304A is connected between the video terminal 104A and the video terminals 201-N. With respect to the video cable 304A, the side of the video terminal 104A is composed of one cable, and the side of the video terminals 201-N is composed of a plurality of cables. That is, all the video signals output from the server 2 are brought together by the video cable 304A, and are input to the KVM switch 1 via the single video terminal 104A.

Since seven signal lines as shown in FIG. 2 are connected to each of the video terminals 201-N, for example, the side of the video terminals 201-N of the video cable 304A has male terminals, each of which includes seven cores. On the other hand, when the server 2 includes ten video terminals 201-N, the side of the video terminal 104A of the video cable 304A has a male terminal including the number of cores more than 70 cores (=7 cores*10 terminals). In this case, each of the video terminals 201-N has a female terminal with seven cores, and the video terminal 104A has a female terminal including the number of cores more than 70 cores. Thus, the number of cores included in the video cable 304A becomes more than the total of the number of cores of the video terminals 201-N with which the server 2 is provided.

With the configuration in FIG. 5, the KVM switch 1 only has to be provided with one video terminal connected with the video terminals 201-N of the server, and hence the KVM switch 1 can be made compact in size. Since the number of video terminals included in the KVM switch 1 is one, the burden imposed on the user when the user attaches or detaches the video cable 304A between/from the KVM switch 1 and the server 2 decreases, and it becomes easy to handle the video cable 304A.

As described above, the side of the video terminals 201-N of the video cable 304A has male terminals, each of which includes seven cores, and each of the video terminals 201-N has a female terminal with seven cores. However, for example, the signal line for the DDC signal is deleted from the video cable 304A, and hence the side of the video terminals 201-N of the video cable 3 04A may have male terminals, each of which includes six cores, and each of the video terminals 201-N may have a female terminal with six cores. In this case, when the server 2 includes ten video terminals 201-N, the side of the video terminal 104A of the video cable 304A has a male terminal including the number of cores more than 60 cores (=6 cores*10 terminals), and the video terminal 104A has a female terminal including the number of cores more than 60 cores.

Therefore, it is possible to thin down the video cable 304A and to suppress costs of the video cable 304A.

Figure 6:
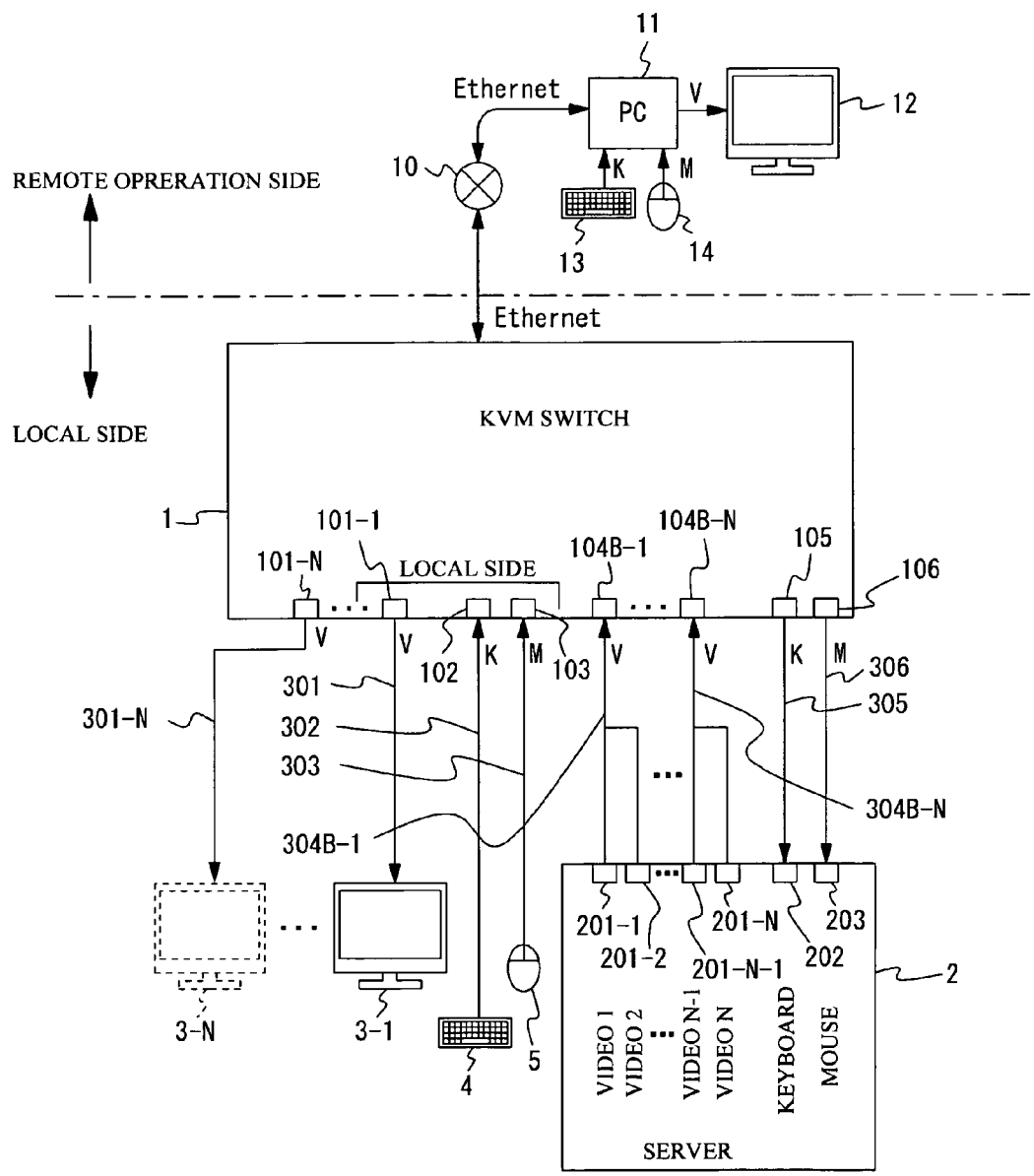
FIG. 6 is a diagram showing a second variation of the switching system for the multi-monitor in FIG. 1.

FIG. 6 is a diagram showing a second variation of the switching system for the multi-monitor in FIG. 1.

Although all the video signals output from the server 2 are brought together in one by the video cable 304A in FIG. 5, two video signals output from the server 2 are brought together in one by each of video cables 304B-N in FIG. 6.

The KVM switch 1 includes the video cables 304B-N on behalf of the video cable 304A in FIG. 5. Each of the video cables 304B-N is connected between a single video terminal 104B-N and two video terminals 201-N. With respect to the video cables 304B-N, the side of the video terminals 104B-N is composed of one cable, and the side of the video terminals 201-N is composed of two cables. That is, the two video signals output from the server 2 are brought together by one of the video cables 304B-N, and are input to the KVM switch 1 via one of the video terminals 104B-N.

Since seven signal lines as shown in FIG. 2 are connected to each of the video terminals 201-N, for example, the side of the video terminals 201-N of each of the video cables 304B-N has male terminals, each of which includes seven cores. On the other hand, the side of the video terminals 104B-N of each of the video cables 304B-N has a male terminal including the number of cores more than 14 cores (=7 cores*2 terminals).

In this case, each of the video terminals 201-N has a female terminal with seven cores, and each of the video terminals 104B-N has a female terminal including the number of cores more than 14 cores. Thus, the number of cores included in each of the video cable 304B-N becomes more than the total of the number of cores of the two video terminals 201-N with which the server 2 is provided.

Although the configuration of FIG. 6 increases the number of video terminals included in the KVM switch 1 in comparison with that of FIG. 5, each of the video cables 304B-N is thinner than the video cable 304A, so that the user can easily handle the video cables 304B-N. When the video signals output from server 2 are fewer in number than the video signals in FIG. 5, low-cost video cables can be used.

Although one of the video terminals 104B-N is connected to two of the video terminals 201-N in the example of FIG. 6, the present embodiment is not limited to this configuration, and one of the video terminals 104B-N may be connected to three or more video terminals 201-N.

In the example of FIG. 6, the signal line for the DDC signal is deleted from each of the video cables 304B-N, and hence the side of the video terminals 201-N of each of the video cables 304B-N may have male terminals, each of which includes six cores, and the side of the video terminals 104-N of each of the video cables 304B-N may have a male terminal with twelve cores. In this case, each of the video terminals 201-N has a female terminal with six cores, each of the video terminals 104B-N has a female terminal with twelve cores. Therefore, it is possible to thin down the video cables 304B-N additionally, and to suppress costs of the video cables 304B-N.

Figure 7:
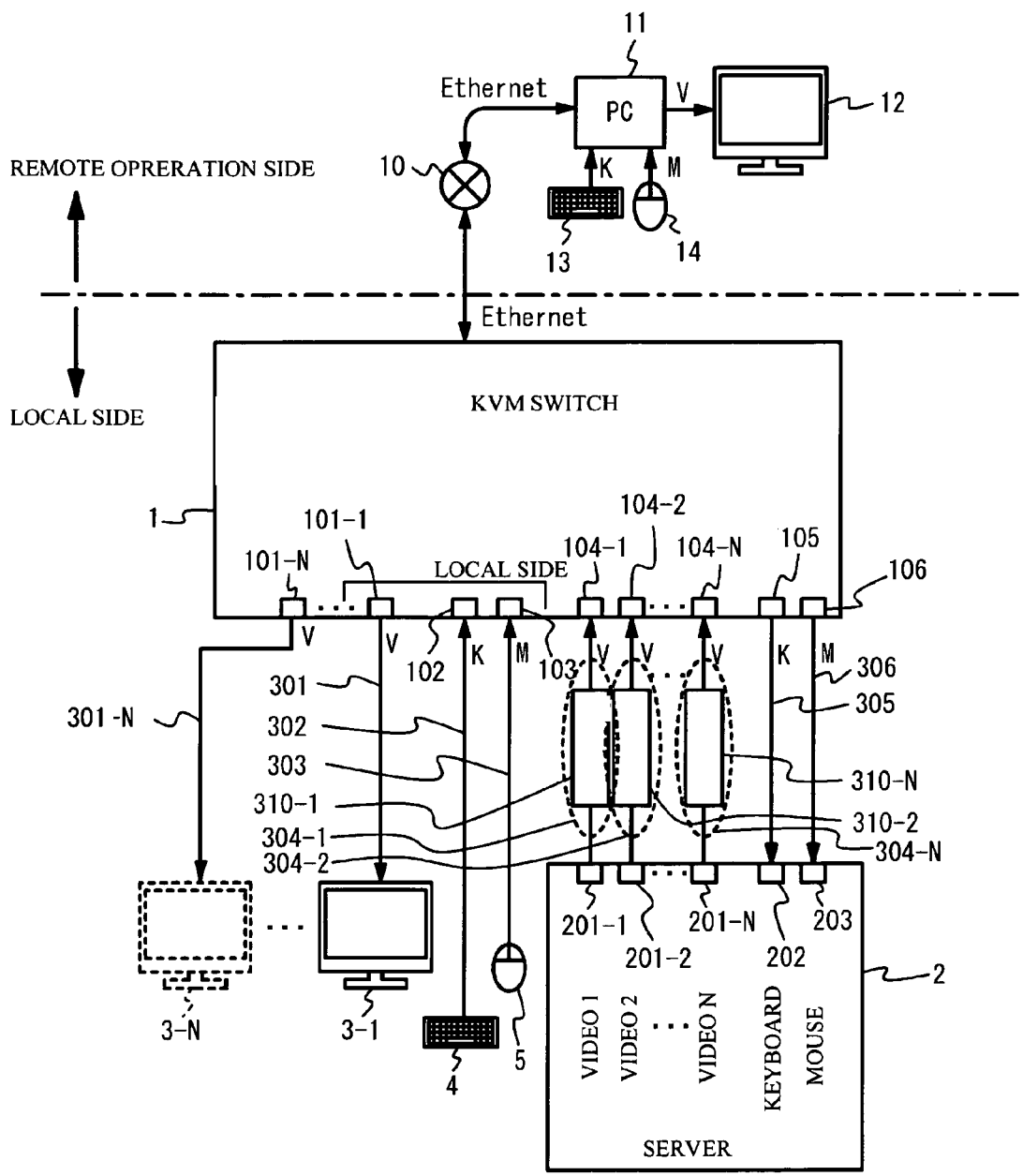
FIG. 7 is a diagram showing a third variation of the switching system for the multi-monitor in FIG. 1.

FIG. 7 is a diagram showing a third variation of the switching system for the multi-monitor in FIG. 1.

The configuration of FIG. 7 is different from that of FIG. 1 in that adapters 3.10-N are connected between the video terminals 104-N and the corresponding video terminals 201-N.

Each of the adapters 310-N converts the video signal output from the server 2 from the analog signal to the digital signal, and outputs the converted digital signal to the KVM switch 1.

FIG. 8A is a block diagram showing the configuration of each of the adapters 310-N, and FIG. 8B is a block diagram showing a first variation of the configuration of each of the adapters 310-N.

Each of the adapters 310-N in FIGS. 8A and 8B includes: an A/D converting circuit 401 (an A/D converting portion) that converts the red signal, the green signal, the blue signal, the horizontal synchronizing signal (Hsync), and the vertical synchronizing signal (Vsync) included in the video signal from the analog signals to the digital signals; a frame buffer and storing circuit 402 that stores the converted digital signals; a serial data converting circuit 403 (a serial data converting portion) that converts the digital signals converted by the frame buffer and storing circuit 402 into serial data; an optical signal/differential signal converting circuit 404 (an optical signal/differential signal converting portion) that converts the serial data converted by the serial data converting circuit 403 into an optical signal or a differential signal, and outputs the optical signal or the differential signal to the KVM switch 1. The frame buffer and storing circuit 402 stores the digital signal for one screen or a plurality of screens, and absorbs a difference between the reception time of the video signal and the transmission time of the serial data.

In each of the adapters 310-N in FIGS. 8A and 8B, the optical signal or the differential signal corresponding to the video signal for one screen is sequentially output to the KVM switch 1.

In FIG. 8A, the DDC signal included in the video signal which is input to each of the adapters 310-N is input to the serial data converting circuit 403. The serial data converting circuit 403 reads out the A/D-converted digital signals from a frame buffer, synthesizes the A/D-converted digital signals with the input DDC signal, converts the synthesized digital signals into the serial data, and outputs the serial data to the optical signal/differential signal converting circuit 404.

In FIG. 8B, the DDC signal included in the video signal which is input to each of the adapters 310-N is directly input to the optical signal/differential signal converting circuit 404, converted into the optical signal or the differential signal, and output to the KVM switch 1. In this case, the optical signal or the differential signal corresponding to the DDC signal is output to the KVM switch 1 via a different signal line from a signal line used by the optical signal or the differential signal corresponding to the red signal, the green signal, the blue signal, the horizontal synchronizing signal (Hsync), and the vertical synchronizing signal (Vsync). For example, the video cable 304-1 in FIG. 7 includes the signal line for the optical signal or the differential signal corresponding to the DDC signal, and the signal line for the optical signal or the differential signal corresponding to the red signal, the green signal, the blue signal, the horizontal synchronizing signal (Hsync), and the vertical synchronizing signal (Vsync).

As shown in a broken line of FIG. 8A, the DDC signal included in the video signal which is input to each of the adapters 310-N is diverted to a ground (GND), and may not be input to the serial data converting circuit 403. In this case, it is possible to suppress an amount of data to be serial-converted.

FIG. 9A is a block diagram showing a second variation of the configuration of each of the adapters 310-N, and FIG. 9B is a block diagram showing a third variation of the configuration of each of the adapters 310-N.

The adapters 310-N in FIGS. 9A and 9B add a difference detecting circuit (a difference detecting portion) 405 that detects the differences between the video signals, i.e., the differences between the present signal for one screen and the previous signal for one screen, to the adapters 310-N in FIGS. 8A and 8B, respectively. The other circuits other than the difference detecting circuit 405 are the same as the corresponding circuits in FIGS. 8A and 8B.

The A/D converting circuit 401 converts the red signal, the green signal, the blue signal, the horizontal synchronizing signal (Hsync), and the vertical synchronizing signal (Vsync) included in the video signal from the analog signals to the digital signals, and outputs the digital signals to the frame buffer and storing circuit 402 and the difference detecting circuit 405. At this time, the digital signals output to the frame buffer and storing circuit 402 and the difference detecting circuit 405 are digital signals for one screen.

The difference detecting circuit 405 inputs the present digital signals for one screen from the A/D converting circuit 401, reads out the previous digital signals for one screen from the frame buffer and storing circuit 402, and detects the differences between the present digital signals for one screen and the previous digital signals for one screen. Then, the difference detecting circuit 405 outputs the detected difference digital signals to the serial data converting circuit 403 as position information and color plane information.

In FIG. 9A, the DDC signal included in the video signal which is input to each of the adapters 310-N is input to the serial data converting circuit 403. The serial data converting circuit 403 reads out the A/D-converted digital signals from a frame buffer, synthesizes the A/D-converted digital signals with the input DDC signal, converts the synthesized digital signals into the serial data, and outputs the serial data to the optical signal/differential signal converting circuit 404.

In FIG. 9B, the DDC signal included in the video signal which is input to each of the adapters 310-N is directly input to the optical signal/differential signal converting circuit 404, converted into the optical signal or the differential signal, and output to the KVM switch 1. In this case, the optical signal or the differential signal corresponding to the DDC signal is output to the KVM switch 1 via a different signal line from a signal line used by the optical signal or the differential signal corresponding to the red signal, the green signal, the blue signal, the horizontal synchronizing signal (Hsync), and the vertical synchronizing signal (Vsync). For example, the video cable 304-1 in FIG. 7 includes the signal line for the optical signal or the differential signal corresponding to the DDC signal, and the signal line for the optical signal or the differential signal corresponding to the red signal, the green signal, the blue signal, the horizontal synchronizing signal (Hsync), and the vertical synchronizing signal (Vsync).

As shown in a broken line of FIG. 9A, the DDC signal included in the video signal which is input to each of the adapters 310-N is diverted to a ground (GND), and may not be input to the serial data converting circuit 403. In this case, it is possible to suppress an amount of data to be serial-converted.

According to each of the adapters 310-N in FIGS. 8A and 8B, or FIGS. 9A and 9B, the optical signal or the differential signal output from each of the adapters 310-N to the KVM switch 1 is one or two, and hence the number of cores of each of the video cables 304-N connected from each of the adapters 310-N to the KVM switch 1 can be reduced, so that the user can easily handle the video cables 304-N.

When each of the adapters 310-N in FIGS. 8A and 8B, or FIGS. 9A and 9B is connected to the KVM switch 1, each of the adapters 310-N converts the video signal from the analog signal to digital signal, so that the A/D converting units 111-N included in the KVM switch 1 become unnecessary. As a result, the KVM switch 1 can be made compact in size.

Further, although each of the adapters 310-N in FIGS. 8A and 8B sequentially outputs the optical signal or the differential signal corresponding to the video signal for one screen to the KVM switch 1, each of the adapters 310-N in FIGS. 9A and 9B sequentially outputs the optical signal or the differential signal corresponding to the differences between the present digital signals for one screen and the previous digital signals for one screen to the KVM switch 1. Therefore, each of the adapters 310-N in FIGS. 9A and 9B can reduce an amount of signals output to the KVM switch 1 more than each of the adapters 310-N in FIGS. 8A and 8B.

Figure 10:
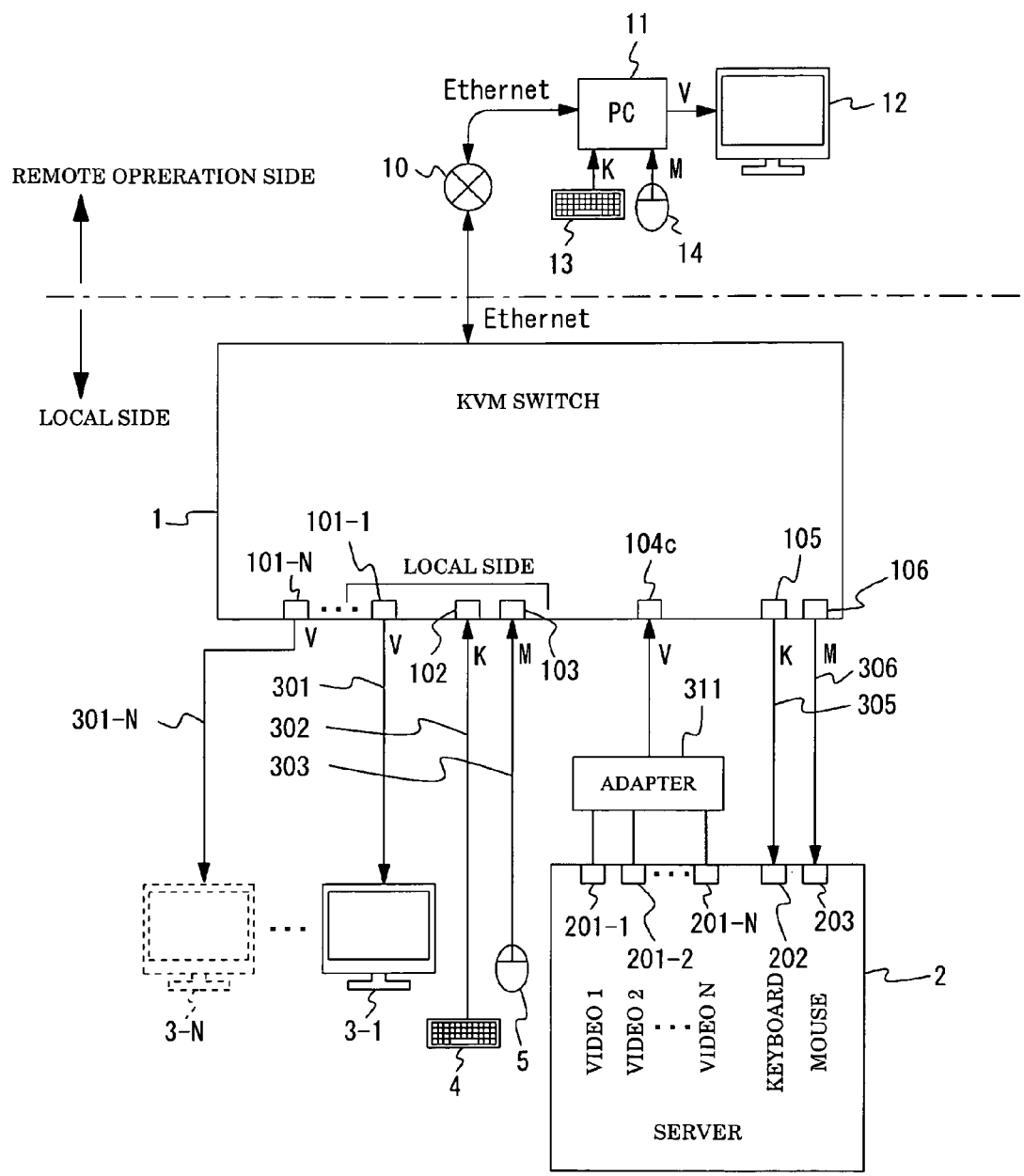
FIG. 10 is a diagram showing a variation of the switching system for the multi-monitor in FIG. 7.

FIG. 10 is a diagram showing a variation of the switching system for the multi-monitor in FIG. 7.

Although each of the adapters 310-N is connected between each of the video terminals 104-N and corresponding one of the video terminals 201-N in the configuration of FIG. 7, a single adapter 311 is connected between a video terminal 104c and the plurality of video terminals 201-N in the configuration of FIG. 10.

As is the case with each of the adapters 310-N described above, the adapter 311 converts the video signal output from the server 2 from the analog signal to the digital signal, and outputs the converted digital signal to the KVM switch 1.

The adapter 311 can adopt the configuration similar to each of the adapters 310-N in FIGS. 8A and 8B, or FIGS. 8A and 8B. By way of example, FIG. 11 shows the configuration of the adapter 311 that adopts the configuration similar to each of the adapters 310-N in FIG. 8A.

The A/D converting circuit 401 in FIG. 11 is the same in movement as the A/D converting circuit 401 in FIG. 8, but is different from the A/D converting circuit 401 in that the video signals to be input increase. Since the frame buffer and storing circuit 402 in FIG. 11 requires frame buffers corresponding to the number of video terminals 201-N, the number of frame buffers included in the frame buffer and storing circuit 402 in FIG. 11 increases more than that of frame buffers included in the frame buffer and storing circuit 402 in FIG. 8A. Since the serial data converting circuit 403 in FIG. 11 sequentially reads out the digital signal from the frame buffer and storing circuit 402, and converts the digital signal into the serial data, the conversion processing can be performed with the single serial data converting circuit 403. Also, conversion processing relating to the optical signal/differential signal converting circuit 404 can be performed with the single optical signal/differential signal converting circuit 404.

Next, a description will now be given of the configuration of each of the adapters 310-N when the video signal output from the server 2 to the KVM switch 1 is the digital signal.

Figure 12A:
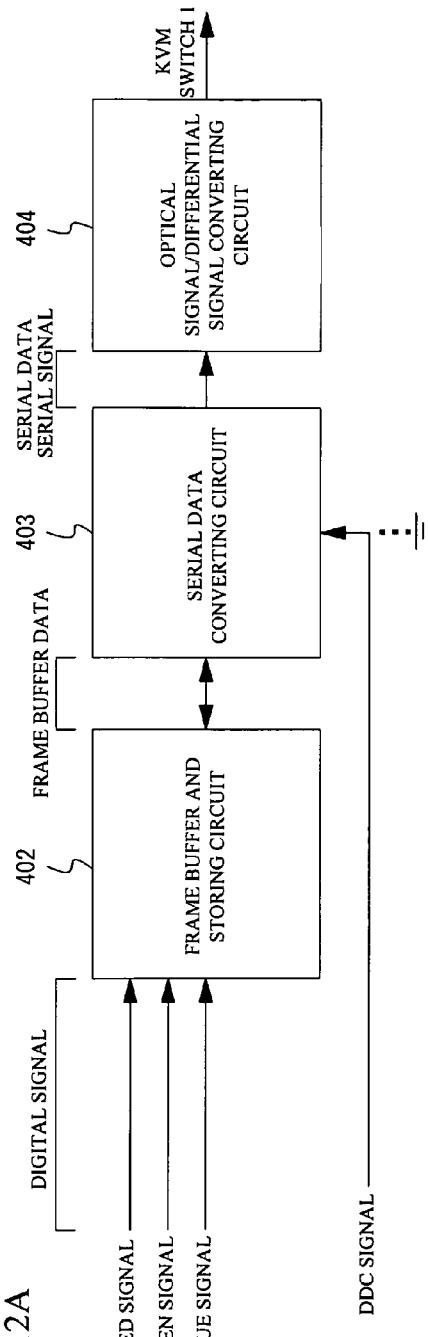
FIG. 12A is a block diagram showing the configuration of each of the adapters 310-N when a video signal is a digital signal.
Figure 12B:
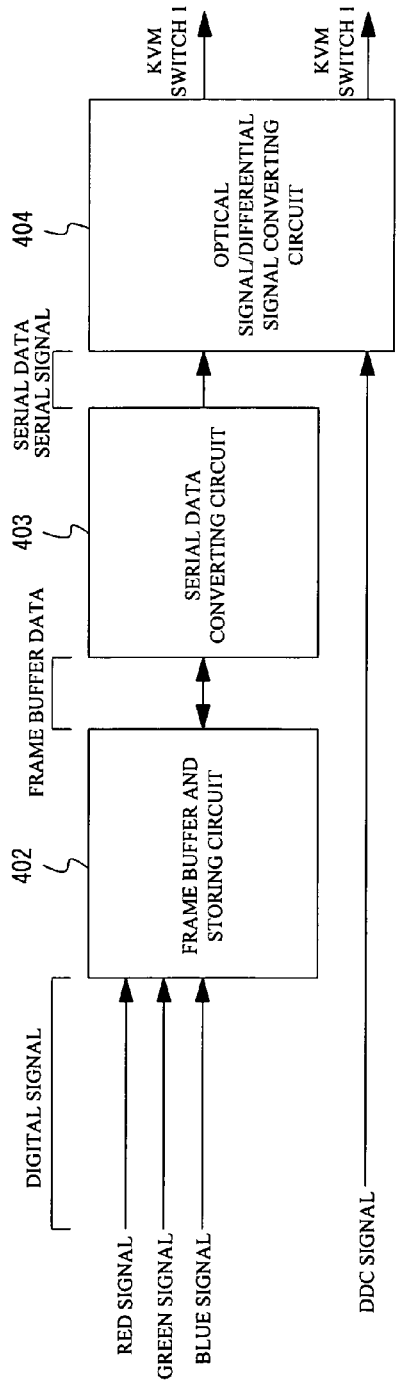
FIG. 12B is a block diagram showing a first variation of the configuration of each of the adapters 310-N when the video signal is the digital signal.

FIG. 12A is a block diagram showing the configuration of each of the adapters 310-N when the video signal is the digital signal, and FIG. 12B is a block diagram showing a first variation of the configuration of each of the adapters 310-N when the video signal is the digital signal.

When the video signal output from the server 2 to the KVM switch 1 is the digital signal, the video signal includes the red signal, the green signal, the blue signal, and the DDC signal, but never includes the horizontal synchronizing signal (Hsync) and the vertical synchronizing signal (Vsync).

Each of the adapters 310-N in FIGS. 12A and 12B includes: a frame buffer and storing circuit 402 that stores the red signal, the green signal, and the blue signal included in the video signal; a serial data converting circuit 403 that converts digital signals converted by the frame buffer and storing circuit 402 into serial data; an optical signal/differential signal converting circuit 404 that converts the serial data converted by the serial data converting circuit 403 into an optical signal or a differential signal, and outputs the optical signal or the differential signal to the KVM switch 1. The frame buffer and storing circuit 402 stores the digital signal for one screen or a plurality of screens, and absorbs a difference between the reception time of the video signal and the transmission time of the serial data.

In each of the adapters 310-N in FIGS. 12A and 12B, the optical signal or the differential signal corresponding to the video signal for one screen is sequentially output to the KVM switch 1.

In FIG. 12A, the DDC signal included in the video signal which is input to each of the adapters 310-N is input to the serial data converting circuit 403. The serial data converting circuit 403 reads out the digital signals from a frame buffer, synthesizes the digital signals with the input DDC signal, converts the synthesized digital signals into the serial data, and outputs the serial data to the optical signal/differential signal converting circuit 404.

In FIG. 12B, the DDC signal included in the video signal which is input to each of the adapters 310-N is directly input to the optical signal/differential signal converting circuit 404, converted into the optical signal or the differential signal, and output to the KVM switch 1. In this case, the optical signal or the differential signal corresponding to the DDC signal is output to the KVM switch 1 via a different signal line from a signal line used by the optical signal or the differential signal corresponding to the red signal, the green signal, and the blue signal. For example, the video cable 304-1 in FIG. 7 includes the signal line for the optical signal or the differential signal corresponding to the DDC signal, and the signal line for the optical signal or the differential signal corresponding to the red signal, the green signal, and the blue signal.

As shown in a broken line of FIG. 12A, the DDC signal included in the video signal which is input to each of the adapters 310-N is diverted to a ground (GND), and may not be input to the serial data converting circuit 403. In this case, it is possible to suppress an amount of data to be serial-converted.

FIG. 13A is a block diagram showing a second variation of the configuration of each of the adapters 310-N when the video signal is the digital signal, and FIG. 13B is a block diagram showing a third variation of the configuration of each of the adapters 310-N when the video signal is the digital signal.

The adapters 310-N in FIGS. 13A and 13B add a difference detecting circuit 405 that detects the differences between the video signals, i.e., the differences between the present signal for one screen and the previous signal for one screen, to the adapters 310-N in FIGS. 12A and 12B, respectively. The other circuits other than the difference detecting circuit 405 are the same as the corresponding circuits in FIGS. 12A and 12B.

The red signal, the green signal, and the blue signal included in the video signal are input to the frame buffer and storing circuit 402 and the difference detecting circuit 405. At this time, the digital signals output to the frame buffer and storing circuit 402 and the difference detecting circuit 405 are digital signals for one screen.

The difference detecting circuit 405 inputs the present digital signals for one screen, reads out the previous digital signals for one screen from the frame buffer and storing circuit 402, and detects the differences between the present digital signals for one screen and the previous digital signals for one screen. Then, the difference detecting circuit 405 outputs the detected difference digital signals to the serial data converting circuit 403 as position information and color plane information.

In FIG. 13A, the DDC signal included in the video signal which is input to each of the adapters 310-N is input to the serial data converting circuit 403. The serial data converting circuit 403 reads out the digital signals from a frame buffer, synthesizes the digital signals with the input DDC signal, converts the synthesized digital signals into the serial data, and outputs the serial data to the optical signal/differential signal converting circuit 404.

In FIG. 13B, the DDC signal included in the video signal which is input to each of the adapters 310-N is directly input to the optical signal/differential signal converting circuit 404, converted into the optical signal or the differential signal, and output to the KVM switch 1. In this case, the optical signal or the differential signal corresponding to the DDC signal is output to the KVM switch 1 via a different signal line from a signal line used by the optical signal or the differential signal corresponding to the red signal, the green signal, and the blue signal. For example, the video cable 304-1 in FIG. 7 includes the signal line for the optical signal or the differential signal corresponding to the DDC signal, and the signal line for the optical signal or the differential signal corresponding to the red signal, the green signal, and the blue signal.

As shown in a broken line of FIG. 13A, the DDC signal included in the video signal which is input to each of the adapters 310-N is diverted to a ground (GND), and may not be input to the serial data converting circuit 403. In this case, it is possible to suppress an amount of data to be serial-converted.

According to each of the adapters 310-N in FIGS. 12A and 12B, or FIGS. 13A and 13B, the optical signal or the differential signal output from each of the adapters 310-N to the KVM switch 1 is one or two, and hence the number of cores of each of the video cables 304-N connected from each of the adapters 310-N to the KVM switch 1 can be reduced, so that the user can easily handle the video cables 304-N.

When each of the adapters 310-N in FIGS. 12A and 12B, or FIGS. 13A and 13B is connected to the KVM switch 1, the A/D converting units 111-N included in the KVM switch 1 become unnecessary. As a result, the KVM switch 1 can be made compact in size.

Further, although each of the adapters 310-N in FIGS. 12A and 12B sequentially outputs the optical signal or the differential signal corresponding to the video signal for one screen to the KVM switch 1, each of the adapters 310-N in FIGS. 13A and 13B sequentially outputs the optical signal or the differential signal corresponding to the differences between the present digital signals for one screen and the previous digital signals for one screen to the KVM switch 1. Therefore, each of the adapters 310-N in FIGS. 13A and 13B can reduce an amount of signals output to the KVM switch 1 more than each of the adapters 310-N in FIGS. 12A and 12B.

When the video signal output from the server 2 to the KVM switch 1 is the digital signal, the single adapter 311 as shown in FIG. 10 may be connected between the single video terminal 104c and the plurality of video terminals 201-N.

The adapter 311 can adopt the configuration similar to each of the adapters 310-N in FIGS. 12A and 12B, or FIGS. 13A and 13B. In this case, since the frame buffer and storing circuit 402 included in the adapter 311 requires frame buffers corresponding to the number of video terminals 201-N, the number of frame buffers included in the adapter 311 increases more than that of frame buffers included in the frame buffer and storing circuit 402 in FIG. 12A, 12B, 13A, or 13B.

When each of the adapters 310-N in FIGS. 9A and 9B, or FIGS. 13A and 13B as described above is utilized, the optical signal or the differential signal corresponding to the differences acquired in advance is output to the KVM switch 1. Therefore, the frame memory storing circuit 112, the frame memories 113-N, and the difference detecting circuit 114 included in the KVM switch 1 are also unnecessary besides the A/D converting units 111-N. In this case, the optical signal or the differential signal is directly input to the signal converting/data generating unit 115 included in the KVM switch 1. The signal converting/data generating unit 15 adds the identification information of the video signal to the optical signal or the differential signal, and outputs the optical signal or the differential signal with the identification information of the video signal to the PC 11 as the video data.

As described in detail above, according to the embodiment of the present invention, the video terminals 104-N input a plurality of video signals, and the signal converting/data generating unit 115 adds the pieces of identification information of the corresponding video signals to the plurality of video signals, respectively, and transmits video data to which the identification information is added, to the PC 11 as the remote terminal via the network 10. Therefore, it is possible to provide a multi-monitor environment for the user with the single KVM switch. Further, the frame memories 113-N sequentially store the plurality of video signals as the pieces of video data, and the difference detecting circuit 114 detects difference video data between the present video data and the previous video data. Then, the signal converting/data generating unit 115 adds the identification information of corresponding video signal to the detected difference video data, and transmits the detected difference video data to which the identification information is added, to the PC 11 as the remote terminal via the network 10. Therefore, compared with the case of the transmission of the whole video data to which the identification information is added, an amount of transmission of data can be reduced.

The KVM switch 1 may execute the software program for realizing the functions of the KVM switch 1. In this manner, the same effects as those of the above described embodiment can also be achieved.

It should be noted that the present invention is not limited to the embodiment, and various modifications may be made to them without departing from the scope of the invention.

The Present application is based on Japanese Patent Applications No. 2007-260352 filed Oct. 3, 2007, and No. 2008-023376 filed Feb. 1, 2008, the entire disclosure of which is hereby incorporated by reference.

What is claimed is:

1. A KVM switch, comprising:
   an inputting portion that is capable of inputting a plurality of video signals output from an information processing apparatus;
   a transmitting portion that adds pieces of identification information of the respective corresponding video signals to the plurality of video signals input by the inputting portion, and transmits the plurality of video signals to which the pieces of identification information are added, to a remote terminal with a multi-monitor environment, via a network; and
   a plurality of connecting portions that are connected to a plurality of displays, and an identification information displaying portion that displays the pieces of identification information of respective corresponding connecting portions on the plurality of displays in response to a depression of a given switch or the input of a given key.

2. The KVM switch as claimed in claim 1, further comprising a storing portion that sequentially stores the plurality of video signals input by the inputting portion as the pieces of video data, and a difference detecting portion that detects difference video data between present video data for one screen and previous video data for one screen with respect to each of the pieces of the sequentially stored video data,
   wherein the transmitting portion adds the identification information of a corresponding video signal to the detected difference video data, and transmits the difference video data to which the identification information of the corresponding video signal is added, to the remote terminal via the network.

3. The KVM switch as claimed in claim 1, wherein each of the plurality of video signals is any one of an analog signal and a digital signal.

4. The KVM switch as claimed in claim 1, further comprising an analog-to-digital converting portion that, when at least one of the plurality of video signals is an analog signal, converts the analog signal into a digital signal.

5. The KVM switch as claimed in claim 1, wherein the information processing apparatus includes a plurality of output terminals that outputs the plurality of video signals,
   the inputting portion is a single input terminal, and a single cable is connected between the plurality of output terminals and the input terminal.

6. The KVM switch as claimed in claim 5, wherein the cable has the structure in which the number of cores is reduced by deleting a signal which shows attribute information of a display, and is output from each of the plurality of output terminals.

7. The KVM switch as claimed in claim 1, wherein the information processing apparatus includes a plurality of output terminals that outputs the plurality of video signals,
   the inputting portion is a plurality of input terminals less than the plurality of output terminals, and each of the plurality of input terminals is connected to a given number of output terminals among the plurality of output terminals via a single cable.

8. The KVM switch as claimed in claim 1, further comprising a plurality of connecting portions that are connected to a plurality of displays, and a switching portion that switches the plurality of video signals which are input from the inputting portion, and are displayed on the displays, respectively.

9. The KVM switch as claimed in claim 1, further comprising a connecting portion that is connected to a display, and an image processing portion that reduces the plurality of video signals input by the inputting portion, synthesize the reduced video signals with each other, and outputs the synthesized video signal to the display.

10. The KVM switch as claimed in claim 1, further comprising a setting portion that sets position relationship of the plurality of displays,
    wherein the transmitting portion adds the pieces of identification information of the connecting portions and information indicative of the position relationship of the plurality of displays set by the setting portion to the difference video data to which the identification information of the corresponding video signal is added, and transmits the resultant difference video data to the remote terminal via the network, and
    the remote terminal displays the resultant difference video data based on the pieces of identification information of the connecting portions and the information indicative of the position relationship of the plurality of displays.

11. The KVM switch as claimed in claim 10, wherein the setting portion further sets information of the size and the resolution of each of the plurality of displays,
    the transmitting portion adds the pieces of identification information of the connecting portions, the information indicative of the position relationship of the plurality of displays set by the setting portion, and the information of the size and the resolution of each of the plurality of displays to the difference video data to which the identification information of the corresponding video signal is added, and transmits the resultant difference video data to the remote terminal via the network, and
    the remote terminal displays the resultant difference video data based on the pieces of identification information of the connecting portions, the information indicative of the position relationship of the plurality of displays, and the information of the size and the resolution of each of the plurality of displays.

12. A KVM system having a plurality of adapters and a KVM switch, comprising:
  each of the plurality of adapters including:
    an analog-to-digital converting portion that inputs an analog video signal output from one of a plurality of output terminals included in an information processing apparatus, and converts the analog video signal into a digital video signal;
    a serial data converting portion that converts the digital video signal into serial data; and
    an optical signal/differential signal converting portion that converts the serial data into an optical signal or a differential signal, and outputs the optical signal or the differential signal to the KVM switch;
  the KVM switch including:
    a storing portion that sequentially stores the optical signal or the differential signal output from each of the plurality of adapters as video data;
    a difference detecting portion that detects difference video data between present video data for one screen and previous video data for one screen with respect to the sequentially stored video data;
    a transmitting portion that adds identification information of a corresponding analog video signal to the detected difference video data, and transmits the difference video data to which the identification information of the corresponding analog video signal is added, to a remote terminal via a network; and
    a plurality of connecting portions that are connected to a plurality of displays, and an identification information displaying portion that displays pieces of identification information of respective corresponding connecting portions on the plurality of displays in response to a depression of a given switch or the input of a given key.

13. The KVM system as claimed in claim 12, wherein when a digital video signal is output from each of the plurality of output terminals included in the information processing apparatus, each of the plurality of adapters includes no analog-to-digital converting portion, and the transmitting portion adds identification information of a corresponding digital video signal to the detected difference video data, and transmits the difference video data to which the identification information of the corresponding digital video signal is added, to the remote terminal via the network.

14. The KVM system as claimed in claim 12, wherein each of the plurality of adapters includes a signal which shows attribute information of a display and is output from a corresponding output terminal in the optical signal or the differential signal.

15. The KVM system as claimed in claim 12, wherein each of the plurality of adapters includes no signal which shows attribute information of a display and is output from a corresponding output terminal in the optical signal or the differential signal.

16. The KVM system as claimed in claim 12, wherein each of the plurality of adapters includes no signal which shows attribute information of a display and is output from a corresponding output terminal in the optical signal or the differential signal, and outputs the signal to the KVM switch in an independent form.

17. The KVM system as claimed in claim 12, wherein the KVM switch further comprises a plurality of connecting portions that are connected to a plurality of displays, and a switching portion that switches the plurality of video signals which are output from the plurality of output terminals included in the information processing apparatus, and are displayed on the displays, respectively.

18. The KVM switch as claimed in claim 12, wherein the KVM switch further comprises a connecting portion that is connected to a display, and an image processing portion that reduces the plurality of video signals output from the plurality of output terminals included in the information processing apparatus, synthesize the reduced video signals with each other, and outputs the synthesized video signal to the display.

19. A KVM system having an adapter and a KVM switch, comprising:
  the adapter including:
    an analog-to-digital converting portion that inputs analog video signals output from a plurality of output terminals included in an information processing apparatus, and converts each of the analog video signals into each of digital video signals;
    a serial data converting portion that converts each of the digital video signals into serial data; and
    an optical signal/ differential signal converting portion that converts the serial data into an optical signal or a differential signal, and outputs the optical signal or the differential signal to the KVM switch;
  the KVM switch including:
    a storing portion that sequentially stores the optical signal or the differential signal as video data;
    a difference detecting portion that detects difference video data between present video data for one screen and previous video data for one screen with respect to the sequentially stored video data;
    a transmitting portion that adds identification information of a corresponding analog video signal to the detected difference video data, and transmits the difference video data to which the identification information of the corresponding analog video signal is added, to a remote terminal via a network; and
    a plurality of connecting portions that are connected to a plurality of displays, and an identification information displaying portion that displays pieces of identification information of respective corresponding connecting portions on the plurality of displays in response to a depression of a given switch or the input of a given key.

20. The KVM system as claimed in claim 19, wherein when the digital video signals are output from the plurality of output terminals included in the information processing apparatus, the adapter includes no analog-to-digital converting portion, and the transmitting portion adds identification information of a corresponding digital video signal to the detected difference video data, and transmits the difference video data to which the identification information of the corresponding digital video signal is added, to the remote terminal via the network.

21. The KVM system as claimed in claim 19, wherein the adapter includes a signal which shows attribute information of a display and is output from a corresponding output terminal in the optical signal or the differential signal.

22. The KVM system as claimed in claim 19, wherein the adapter includes no signal which shows attribute information of a display and is output from a corresponding output terminal in the optical signal or the differential signal.

23. The KVM system as claimed in claim 19, wherein the adapter includes no signal which shows attribute information of a display and is output from a corresponding output terminal in the optical signal or the differential signal, and outputs the signal to the KVM switch in an independent form.

24. A KVM system having a plurality of adapters and a KVM switch, comprising:

each of the plurality of adapters including:
an analog-to-digital converting portion that inputs an analog video signal output from one of a plurality of output terminals included in an information processing apparatus, and converts the analog video signal into a digital video signal;
a storing portion that sequentially stores the digital video signal;
a difference detecting portion that detects difference video signal between present video signal for one screen and previous video signal for one screen with respect to the sequentially stored digital video signal;
a serial data converting portion that converts the detected difference video signal into serial data; and
an optical signal/ differential signal converting portion that converts the serial data into an optical signal or a differential signal, and outputs the optical signal or the differential signal to the KVM switch;

the KVM switch including:
a transmitting portion that adds identification information of a corresponding analog video signal to the optical signal or the differential signal output from each of the plurality of adapters, and transmits the optical signal or the differential signal to which the identification information of the corresponding analog video signal is added, to a remote terminal via a network as video data; and
a plurality of connecting portions that are connected to a plurality of displays, and an identification information displaying portion that displays the pieces of identification information of respective corresponding connecting portions on the plurality of displays in response to a depression of a given switch or the input of a given key.

25. The KVM system as claimed in claim 24, wherein when a digital video signal is output from each of the plurality of output terminals included in the information processing apparatus, each of the plurality of adapters includes no analog-to-digital converting portion, and the transmitting portion adds identification information of a corresponding digital video signal to the detected difference video data, and transmits the difference video data to which the identification information of the corresponding digital video signal is added, to the remote terminal via the network as video data.

26. The KVM system as claimed in claim 24, wherein each of the plurality of adapters includes a signal which shows attribute information of a display and is output from a corresponding output terminal in the optical signal or the differential signal.

27. The KVM system as claimed in claim 24, wherein each of the plurality of adapters includes no signal which shows attribute information of a display and is output from a corresponding output terminal in the optical signal or the differential signal.

28. The KVM system as claimed in claim 24, wherein each of the plurality of adapters includes no signal which shows attribute information of a display and is output from a corresponding output terminal in the optical signal or the differential signal, and outputs the signal to the KVM switch in an independent form.

29. A KVM system having a adapter and a KVM switch, comprising:

the adapter including:
an analog-to-digital converting portion that inputs analog video signals output from a plurality of output terminals included in an information processing apparatus, and converts each of the analog video signals into each of digital video signals;
a storing portion that sequentially stores the digital video signals;
a difference detecting portion that detects difference video signal between present video signal for one screen and previous video signal for one screen with respect to each of the sequentially stored digital video signals;
a serial data converting portion that converts each of the detected difference video signals into serial data; and
an optical signal/ differential signal converting portion that converts the serial data into an optical signal or a differential signal, and outputs the optical signal or the differential signal to the KVM switch;

the KVM switch including:
a transmitting portion that adds identification information of a corresponding analog video signal to the optical signal or the differential signal output from the adapter, and transmits the optical signal or the differential signal to which the identification information of the corresponding analog video signal is added, to a remote terminal via a network as video data; and
a plurality of connecting portions that are connected to a plurality of displays, and an identification information displaying portion that displays the pieces of identification information of respective corresponding connecting portions on the plurality of displays in response to a depression of a given switch or the input of a given key.

30. The KVM system as claimed in claim 29, wherein when the digital video signals are output from the plurality of output terminals included in the information processing apparatus, the adapter includes no analog-to-digital converting portion, and the transmitting portion adds identification information of a corresponding digital video signal to the detected difference video data, and transmits the difference video data to which the identification information of the corresponding digital video signal is added, to the remote terminal via the network.

31. The KVM system as claimed in claim 29, wherein the adapter includes a signal which shows attribute information of a display and is output from a corresponding output terminal in the optical signal or the differential signal.

32. The KVM system as claimed in claim 29, wherein the adapter includes no signal which shows attribute information of a display and is output from a corresponding output terminal in the optical signal or the differential signal.

33. The KVM system as claimed in claim 29, wherein the adapter includes no signal which shows attribute information of a display and is output from a corresponding output terminal in the optical signal or the differential signal, and outputs the signal to the KVM switch in an independent form.

* * * * *